United States Patent
Sharma et al.

(10) Patent No.: US 11,748,679 B2
(45) Date of Patent: Sep. 5, 2023

(54) EXTENDED REALITY BASED IMMERSIVE PROJECT WORKSPACE CREATION

(71) Applicant: ACCENTURE GLOBAL SOLUTIONS LIMITED, Dublin (IE)

(72) Inventors: Vibhu Saujanya Sharma, Bangalore (IN); Rohit Mehra, Delhi (IN); Vikrant Kaulgud, Pune (IN); Sanjay Podder, Thane (IN); Adam Patten Burden, Tampa, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 313 days.

(21) Appl. No.: 16/869,388

(22) Filed: May 7, 2020

(65) Prior Publication Data

US 2020/0356917 A1    Nov. 12, 2020

(30) Foreign Application Priority Data

May 10, 2019    (IN) .............................. 201911018694

(51) Int. Cl.
| | |
|---|---|
| *G06Q 10/0631* | (2023.01) |
| *G06Q 10/105* | (2023.01) |
| *G06Q 10/10* | (2023.01) |
| *G06T 19/00* | (2011.01) |
| *G06Q 10/067* | (2023.01) |
| *G06F 16/2457* | (2019.01) |
| *G06Q 10/101* | (2023.01) |

(52) U.S. Cl.
CPC ..... *G06Q 10/06316* (2013.01); *G06Q 10/103* (2013.01); *G06Q 10/105* (2013.01); *G06T 19/006* (2013.01); *G06F 16/24578* (2019.01); *G06Q 10/067* (2013.01); *G06Q 10/101* (2013.01); *G06T 2219/024* (2013.01)

(58) Field of Classification Search
CPC ........... G06Q 10/067; G06Q 10/06316; G06Q 10/101; G06Q 10/103; G06Q 10/105; G06F 16/24578; G06T 19/006; G06T 2219/024
USPC ...................................................... 705/7.26
See application file for complete search history.

(56) References Cited

U.S. PATENT DOCUMENTS

| | | | |
|---|---|---|---|
| 10,896,545 B1 * | 1/2021 | Kin ................... | G02B 27/0172 |
| 2015/0362733 A1 | 12/2015 | Spivack | |
| 2017/0010662 A1 * | 1/2017 | Nishizawa .............. | G06F 3/013 |

(Continued)

OTHER PUBLICATIONS

J. T. Biehl, M. Czerwinski, M. Czerwinski, G. Smith, and G. G. Robertson, "Fastdash: A visual dashboard for fostering awareness in software teams". In Proceedings of the SIGCHI Conference on Human Factors in Computing Systems, CHI '07, 2007.

(Continued)

*Primary Examiner* — Charles Guiliano
(74) *Attorney, Agent, or Firm* — Mannava & Kang, P.C.

(57) ABSTRACT

In some examples, extended reality based immersive project workspace creation may include obtaining sensing data from at least one sensor of a device worn by a user, and analyzing, based on the sensing data, an environment of the user. A plurality of insights associated with the user may be determined, and prioritized based on a plurality of prioritization criteria. An insight of the plurality of prioritized insights associated with the user may be rendered in the environment of the user. Further, the rendering of the insight may be controlled based on an interaction of the user with the rendered insight.

18 Claims, 33 Drawing Sheets

(56) References Cited

U.S. PATENT DOCUMENTS

| | | | | |
|---|---|---|---|---|
| 2017/0364153 | A1* | 12/2017 | Kazansky | G06F 3/011 |
| 2018/0165853 | A1* | 6/2018 | Inagi | G06F 3/147 |
| 2018/0341811 | A1* | 11/2018 | Bendale | G06V 10/235 |
| 2019/0056791 | A1 | 2/2019 | Holz et al. | |
| 2020/0053262 | A1* | 2/2020 | Wexler | G06F 3/16 |
| 2020/0258013 | A1* | 8/2020 | Monnett | G06Q 10/06 |

OTHER PUBLICATIONS

L.-T. Cheng, S. Hupter, S. Ross, and J. Patterson, "Jazzing up eclipse with collaborative tools". In Proceedings of the 2003 OOPSLA Workshop on Eclipse Technology eXchange, eclipse '03, 2003.

A. Elliott, B. Peiris, and C. Parnin, "Virtual reality in software engineering: Affordances, applications, and challenges". In 2015 IEEE/ACM 37th IEEE International Conference on Software Engineering, vol. 2, pp. 547-550, May 2015.

D. Mishra and A. Mishra, "Workspace environment for collaboration in small software development organization". In Proceedings of the 5th International Conference on Cooperative Design, Visualization, and Engineering, CDVE '08, Berlin, Heidelberg, 2008. Springer-Verlag.

M. Oppezzo and D. L. Schwartz. "Give your ideas some legs: The positive effect of walking on creative thinking". Journal of experimental psychology: learning, memory, and cognition, 40(4), 2014.

K. Panetta. Gartner Top 10 Strategic Technology Trends for 2019, 2019 (accessed Feb. 1, 2019).

C. Ramos, G. Marreiros, R. Santos, and C. F. Freitas. Smart offices and intelligent decision rooms. In Handbook of Ambient Intelligence and Smart Environments, pp. 851-880. Springer, 2010.

R. M. Ripley, A. Sarma, and A. van der Hoek. "A visualization for software project awareness and evolution". In 2007 4th IEEE International Workshop on Visualizing Software for Understanding and Analysis, pp. 137-144, Jun. 2007.

V. S. Sharma and V. Kaulgud. "Pivot: Project insights and visualization toolkit". In 2012 3rd International Workshop on Emerging Trends in Software Metrics (WETSoM), pp. 63-69, Jun. 2012.

V. S. Sharma, R. Mehra, and V. Kaulgud. What do developers want?: An advisor approach for developer priorities. In Proceedings of the 10th International Workshop on Cooperative and Human Aspects of Software Engineering, '17, pp. 78-81. IEEE Press, 2017.

V. S. Sharma, R. Mehra, V. Kaulgud, and S. Podder. "An immersive future for software engineering: Avenues and approaches". In Proceedings of the 40th International Conference on Software Engineering: New Ideas and Emerging Results, ICSE-NIER '18, New York, NY, USA, 2018.

N. A. Streitz, C. Rocker, T. Prante, D. van Alphen, R. Stenzel, and C. Magerkurth. "Designing smart artifacts for smart environments". Computer, 38(3):41-49, Mar. 2005.

M. Tory and T. Moller. "Human factors in visualization research". IEEE Transactions on Visualization and Computer Graphics, (1), Jan. 2004.

C. Treude and M. Storey. "Awareness 2.0: staying aware of projects, developers and tasks using dashboards and feeds". In 2010 ACM/IEEE 32nd International Conference on Software Engineering, May 2010.

P. Vate-U-Lan. "An augmented reality 3d pop-up book: The development of a multimedia project for english language teaching". In 2012 IEEE International Conference on Multimedia and Expo, Jul. 2012.

J. Whitehead. "Collaboration in software engineering: A roadmap". In 2007 Future of Software Engineering, FOSE '07, pp. 214-225, Washington, DC, USA, 2007. IEEE Computer Society.

* cited by examiner

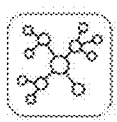

| Insights Prioritization Analyzer | Insights Prioritization | Configuration Based |

Individual Configurations Repository

| Wearer | Role | Specific Subject | Insight | Notes |
|---|---|---|---|---|
| Manager (MGR-1) | Developer | | (IMO1) Time To Next Commit (IMO2) Developer Regularity (IMO3) Developer Velocity | |
| Manager (MGR-1) | Tester | | (IMT1) Issues Reported (IMT2) Issues Assigned | |
| Manager (MGR-1) | Developer | Developer (DEV-1) | (IMD4) Developer Sentiment | Talk to DEV-1 regarding any problems with assigned work or team members. |
| Developer (DEV-1) | ALL | | (IDA1) Recognitions | |
| Developer (DEV-1) | Manager | Lead | | Unable to resolve this issue IRS-4171. Need help! |

```
OBTAIN SENSING DATA FROM AT LEAST ONE SENSOR OF A DEVICE
WORN BY A USER
3202
```

```
ANALYZE, BASED ON THE SENSING DATA, AN ENVIRONMENT OF THE
USER
3204
```

```
DETERMINE, BASED ON THE ANALYZED ENVIRONMENT OF THE USER,
A PLURALITY OF INSIGHTS ASSOCIATED WITH A PROJECT BEING
PERFORMED BY THE USER
3206
```

```
RENDER, IN THE ENVIRONMENT OF THE USER, AT LEAST ONE INSIGHT
OF THE PLURALITY OF INSIGHTS ASSOCIATED WITH PROJECT BEING
PERFORMED BY THE USER
3208
```

*FIG. 32*

EXTENDED REALITY BASED IMMERSIVE PROJECT WORKSPACE CREATION

PRIORITY

The present application claims priority under 35 U.S.C. 119(a)-(d) to Indian Provisional Patent Application number 201911018694, having a filing date of May 10, 2019, the disclosure of which is hereby incorporated by reference in its entirety.

BACKGROUND

Implementation of a project may include collaboration between team members in an area such as a project workspace. A collaboration session may include aspects such as brainstorming to conceive or otherwise discuss current and/or future activities related to the project. Various technologies may be utilized to facilitate the implementation of the project.

BRIEF DESCRIPTION OF DRAWINGS

Features of the present disclosure are illustrated by way of example and not limited in the following figure(s), in which like numerals indicate like elements, in which:

FIGS. 19-27 illustrate configuration based insights prioritization for the insights prioritization analyzer of the extended reality based immersive project workspace creation apparatus of FIG. 1 in accordance with an example of the present disclosure;

FIG. 32 illustrates a flowchart of an example method for extended reality based immersive project workspace creation in accordance with an example of the present disclosure.

DETAILED DESCRIPTION

Figure 1:
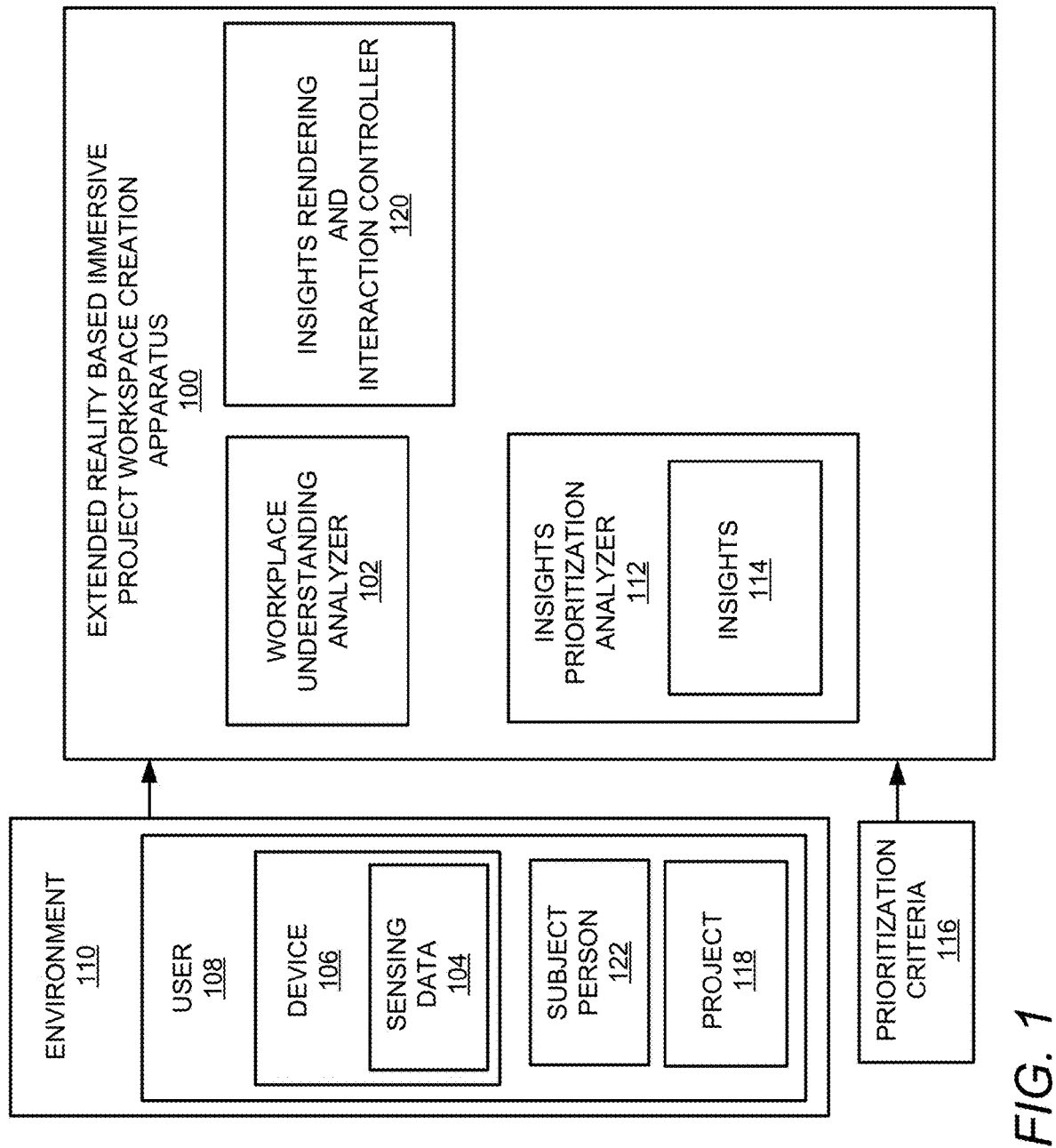
FIG. 1 illustrates a layout of an extended reality based immersive project workspace creation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Extended reality based immersive project workspace creation apparatuses, methods for extended reality based immersive project workspace creation, and non-transitory computer readable media having stored thereon machine readable instructions to provide extended reality based immersive project workspace creation are disclosed herein. The apparatuses, methods, and non-transitory computer readable media disclosed herein provide for extended reality based immersive project workspace creation by utilizing extended reality (XR) technology to augment a project bay, such as a software project bay, with insights that are anchored on and around real objects in a workspace. The apparatuses, methods, and non-transitory computer readable media disclosed herein may include mining of data exhaust (e.g., disparate sources of data and logs) of a project, such as a software project and development environment, for data that may be relevant for constructing insights relevant to an extended reality headset wearer (e.g., a user as disclosed herein) and an associated team. The extended reality headset wearer's location and parts of the workspace (e.g., floors, furniture, ceilings, etc.) may be detected in the wearer's field of view. Spatial mapping may be utilized to overlay relevant representations of the relevant insights onto and/or around the wearer. The immersive insights may be contextual, may be continuously updated, and may leverage affordances of human perception, for improved comprehension, and enhanced creativity as well as recall. The relevant representations may range from heatmaps regarding important project metrics overlaid on a ceiling above a project team as an evolving heatmap, to bulbs and/or traffic lights above individual project team members signifying if the team members need guidance, to virtual displays on walls showcasing the latest performance and priorities.

With respect to the apparatuses, methods, and non-transitory computer readable media disclosed herein, project workspaces, such as software project workspaces, may represent areas of constant project activities across different phases of a software development lifecycle. Besides being physical spaces to house project team members, the project workspaces may also represent areas of teamwork, creativity and collaboration. For an example of a software project implementation as disclosed herein, there may be several information and insight needs of software teams (both individual and collective) during the course of any project. In this regard, it is technically challenging to use of the project workspaces themselves for assisting with the obtaining of such insights.

Yet further, in a typical project scenario, such as a software project scenario, in order to gain any insights or guidance, a project team member may either depend on their tacit knowledge and/or perception of the overall team status from past conversations. Alternatively or additionally, the project team member may depend on viewing standard reports or documents (on their workstation screen only). Alternatively or additionally, the project team member may rely on emails, chats, and/or instant messages on their phone to gain new information while in the project bay and/or workspace (e.g., not on their workstations). Alternatively or additionally, the project team member may look at static printed charts and/or figures, such as an initial blueprint of software architecture on walls of the project bay. Alternatively or additionally, the project team member may spend time manually traversing disparate knowledge sources within the project infrastructure.

These modes of insights may be relatively limited, not-current, often subjective, and may not take into account the situational and contextual perspective associated with a project team member. The situational and contextual perspective may include a project team member's project context as well as where they are seated, what are they looking at, are they moving within the project bay for a particular purpose, such as an impending meeting or collaboration, etc. Further, the project team member may miss aspects of context which may be mutually important to the project team member as well as the project team at that point in time (e.g., not just the individual context and situation).

With respect to engineering disciplines, such as software engineering, such disciplines may utilize effective communication, coordination and collaboration, amongst all members of the engineering team. Despite the dispersion of teams in globally distributed development centers or crowd-sourcing, relatively significant parts of a team may be collocated in a single location and workspace. For example, information technology services companies may include relatively large delivery bays where numerous architects, developers and testers work together to deliver software to clients.

In modern environments, workplace industrial floors, urban communities, cities, etc., may be intelligent and augmented through sensors, machine learning, immersive visualizations, etc. Software development bays and/or workspaces may be large work areas as well, and potentially need to be considered for similar advances towards making them smarter and help the project team members use them. In this regard, it is technically challenging to implement a smart workspace that utilizes the entire physical area of the bay as a medium for creating information radiators, visualizing contextual insights, and other collaboration tools.

The apparatuses, methods, and non-transitory computer readable media disclosed herein may address the technical challenges disclosed herein by implementing a conversational virtual agent (e.g., a desktop-based agent) and an augmented reality based system to provide ambient awareness to developers as part of a larger intelligence augmentation framework. For example, the apparatuses, methods, and non-transitory computer readable media disclosed herein may implement desktop-based agents to provide different types of modalities that provide ambient awareness to developers and those in other project roles.

According to another example, the apparatuses, methods, and non-transitory computer readable media disclosed herein may further address the technical challenges disclosed herein by implementing extended reality to influence various software engineering activities. That is, the apparatuses, methods, and non-transitory computer readable media disclosed herein may implement extended reality to provide a non-intrusive basis for injecting smartness in physical workspaces. For example, the apparatuses, methods; and non-transitory computer readable media disclosed herein may apply the concepts of smart spaces with extended reality as a medium to create smarter information radiators for providing ambient awareness and immersive insights to developers.

Yet further, deliverables, such as software deliverables, may be inherently collaborative, and require project members with different roles to collaborate on various activities and be aware of how everyone is contributing to tasks that may be interdependent, and quickly share context with each other throughout the delivery life-cycle. However, the way project team members may arrive at such awareness and insights may involve a multitude of steps.

The use of the project delivery bays, walls, floors or furniture for any work-item or team level insight may be predominately absent. For example, a software project team member's workstation or work desk may be the place where the team member performs most of the activities pertinent to software delivery. However, the workstation or work desk may not play any significant role in such activities.

A project team member may play different roles at different points in time and also may need to interact with different roles, and in each such instance there may be different insights and/or understanding needs based on their context and activities. In this regard, the work desk space of a team member may not play a significant role, and may instead be used to house a laptop with a physical desk to put papers, or mouse and/or keyboards on, and in some cases a small whiteboard and/or partition frame on which notes may be put on (either by writing on or sticking them on). Often this space may become an informal collaboration and discussion space with another team member.

The apparatuses, methods, and non-transitory computer readable media disclosed herein may provide for utilization of the work-desk area of a project team member by providing the team member with insights and visualizations based upon their context and state in a project. The apparatuses, methods, and non-transitory computer readable media disclosed herein may also allow for the work-desk space to be used as a smart immersive collaborative space by two or more team members.

According to examples disclosed herein, the apparatuses, methods, and non-transitory computer readable media disclosed herein may map and convert the work-desk space around a project team member into a three-dimensional (3D) canvas on which insights pertinent to the team member, which may be determined using disparate sources of project data and logs, are placed as visual models. These may include a stack of work items as 3D blocks of different shapes and sizes, immersive interactive visualizations of the procedures or flows in or with respect to the artifact the project team member is engaged in, or other metaphors such as bulbs, etc., signaling relevant events.

The apparatuses, methods, and non-transitory computer readable media disclosed herein may further provide for a work-desk to become a collaborative immersive workbench upon which mutually controllable artifact depictions (e.g., 3D structure of a part of a process or system relevant to both) or insights views can be placed, manipulated and explored by two or more software project team members based upon their shared contexts. This may allow for the next generation of visual insights, recommendations, and contextual collaboration which is immersive in nature. The immersion in 3D stereoscopic environments may provide for the leveraging of affordances of human perception, such as spatial memory, motion, manipulation and feedback for better comprehension, enhanced creativity as well as recall, thus making contextual collaboration more intuitive.

Extended reality, which encompasses virtual reality (VR), augmented reality (AR), and mixed reality (MR), when coupled with software analytics, may be implemented as disclosed herein for utilizing project workspaces providing such immersive insights which may be situational, viewsensitive, contextual and real-time. Immersive experiences may leverage affordances of natural human perception spatial memory, and navigation and manipulation for better comprehension of 3D visualizations and enhanced creativity. These experiences may also be non-intrusive, which may provide lower disruption in day-to-day processes. Moreover, the placement and type of the insights may be highly customizable as well, thus providing a seamless flow of awareness throughout the workspace.

The apparatuses, methods, and non-transitory computer readable media disclosed herein may categorize the types for insights and understanding for the various roles in a project team, such as a software team, based on what kind of activity is being performed with respect to the project bay. For example, a project member at their desk may be primarily interested in viewing insights specific to their own work that includes the kind of activities being artefact and task-centric. If the team member does get up and look around, they may be interested in awareness about the project team and the overall progress of the project with respect to a superset of insights across the team, and finally if the team member walks towards a particular bay or a set of other team members, they may be interested in knowing the insights relevant to themselves about the team members in the field of view.

In order to focus on specific types of insight and awareness needs in specific areas of the workspace, the apparatuses, methods, and non-transitory computer readable media disclosed herein may implement three categories of immersive insights that may be presented to the viewers, based upon the placement of the visualizations in the workspace and/or work desk, across-the-bay, and specific people and/or aisle.

For the apparatuses, methods, and non-transitory computer readable media disclosed herein, mixed reality, which allows for spatial mapping, merging the virtual objects with the live scene, and more advanced interactions than augmented or virtual reality in certain circumstances, may be implemented in the context of such visualizations. This may be due to the non-blocking, augmentable (augmenting the real world context), natural (e.g., hand gestures) features of mixed reality interactions, which may result in lesser context switching in general than virtual reality, in certain circumstances. Moreover, because of the open field of view in mixed reality, opportunities for fluid collaboration may also be provided.

The apparatuses, methods, and non-transitory computer readable media disclosed herein may thus account for a team member's context, and then combine disparate data from a project based on a model of interrelationships between different project entities, to combine different immersive visualizations which may be dynamically placed at different anchor points in a project workspace, such as a software project workspace. The visualizations may include 3D overlays in the project bays that are pertinent, intuitive and easy to relate.

According to examples disclosed herein, the apparatuses, methods, and non-transitory computer readable media disclosed herein may provide continuously updated, objective and contextual views which may be different for each individual looking around the project bay.

According to examples disclosed herein, the apparatuses, methods, and non-transitory computer readable media disclosed herein may provide complete flexibility and modifiability without the risk (and expense) of getting locked-in into a particular type of indicators and/or display on premise.

According to examples disclosed herein, the apparatuses, methods, and non-transitory computer readable media disclosed herein may leverage affordances of human perception spatial memory, motion, manipulation and feedback for better comprehension, enhanced creativity as well as recall.

According to examples disclosed herein, the apparatuses, methods, and non-transitory computer readable media disclosed herein may be implemented on non-extended reality devices as well. For example, a user may be able to see some of the same visualizations using new smartphones and tablets where possible.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example extended reality based immersive project workspace creation apparatus (hereinafter also referred to as "apparatus 100").

Referring to FIG. 1, the apparatus 100 may include a workplace understanding analyzer 102 that is executed by at least one hardware processor (e.g., the hardware processor 3102 of FIG. 31, and/or the hardware processor 3304 of FIG. 33) to obtain sensing data 104 from at least one sensor of a device 106 worn or otherwise utilized by a user 108. The workplace understanding analyzer 102 may analyze, based on the sensing data 104, an environment 110 of the user 108.

An insights prioritization analyzer 112 that is executed by the at least one hardware processor (e.g., the hardware processor 3102 of FIG. 31, and/or the hardware processor 3304 of FIG. 33) may determine, based on the analyzed environment 110 of the user 108, a plurality of insights 114 associated with the user 108. In this regards, the insights 114 may be associated with the user 108 and/or a project 118 being performed by the user 108. For example, insights 114 associated with the user 108 may include, for example, a status of the user (e.g., busy, not busy), a role of the user (e.g., manager, developer, etc.). Further, insights 114 associated with the project 118 may include, for example, a heatmap, a project-specific display, and other such insights associated with the project 118. The insights prioritization analyzer 112 may prioritize the plurality of insights 114 based on a plurality of prioritization criteria 116. At least one prioritization criterion of the plurality of prioritization criteria 116 may account for the project 118 being performed by the user 108.

An insights rendering and interaction controller 120 that is executed by the at least one hardware processor (e.g., the hardware processor 3102 of FIG. 31, and/or the hardware processor 3304 of FIG. 33) may render, in the environment 110 of the user 108, at least one insight of the plurality of prioritized insights 114 associated with the user 108, Further, the insights rendering and interaction controller 120 may control, based on an interaction of the user 108 with the rendered at least one insight, the rendering of the at least one insight.

According to examples disclosed herein, the insights prioritization analyzer 112 that is executed by the at least one hardware processor (e.g., the hardware processor 3102 of FIG. 31, and/or the hardware processor 3304 of FIG. 33) may determine, based on the analyzed environment 110 of the user 108, the plurality of insights 114 associated with the user 108 by determining, based on an analysis of project data (e.g., that includes type of project, timelines associated with project, deliverable requirements associated with project, personnel involved in project, etc.) associated with the project 118 and the analyzed environment 110 of the user 108, the plurality of insights 114 associated with the user 108.

According to examples disclosed herein, the insights prioritization analyzer 112 that is executed by the at least one hardware processor (e.g., the hardware processor 3102 of FIG. 31, and/or the hardware processor 3304 of FIG. 33) may determine, based on the analyzed environment 110 of the user 108, the plurality of insights 114 associated with the user 108 by determining, based on the analyzed environment 110 of the user 108, the plurality of insights 114 that include a heatmap regarding a project metric associated with the project 118, a light specifying a status associated with the user 108, and/or a virtual display specifying a performance level associated with the user 108.

According to examples disclosed herein, the workplace understanding analyzer 102 that is executed by the at least one hardware processor (e.g., the hardware processor 3102 of FIG. 31, and/or the hardware processor 3304 of FIG. 33) may map the environment 110 of the user 108 into a three-dimensional (3D) canvas. Further, the insights rendering and interaction controller 120 that is executed by the at least one hardware processor (e.g., the hardware processor 3102 of FIG. 31, and/or the hardware processor 3304 of FIG. 33) may render, on the 3D canvas, the at least one insight of the plurality of prioritized insights associated with the user 108.

According to examples disclosed herein, the workplace understanding analyzer 102 that is executed by the at least one hardware processor (e.g., the hardware processor 3102 of FIG. 31, and/or the hardware processor 3304 of FIG. 33) may identify, in the environment 110 of the user 108, a subject person 122. Further, the insights prioritization analyzer 112 that is executed by the at least one hardware processor (e.g., the hardware processor 3102 of FIG. 31, and/or the hardware processor 3304 of FIG. 33) may determine, based on a shared context (e.g., a relationship of the user 108 to the subject person 122, such as a role of the user as a manager and a role of the subject person as a developer) between the user 108 and the subject person 122, the plurality of insights 114 associated with the user 108.

According to examples disclosed herein, the insights prioritization analyzer 112 that is executed by the at least one hardware processor (e.g., the hardware processor 3102 of FIG. 31, and/or the hardware processor 3304 of FIG. 33) may modify, based on a modification to the shared context between the user 108 and the subject person 122, the plurality of insights 114 associated with the user 108. For example, any modification of the role of the user 108 relative to the subject person 122 may result in modification of the insights 114 associated with the user 108.

According to examples disclosed herein, the insights rendering and interaction controller 120 that is executed by the at least one hardware processor (e.g., the hardware processor 3102 of FIG. 31, and/or the hardware processor 3304 of FIG. 33) may ascertain, for the subject person 122, a list of insights that is configured by the subject person 122 (e.g., where the subject person 122 specifies specific insights that may be displayed with respect to the subject person) from a plurality of insights associated with the subject person. Further, the insights rendering and interaction controller 120 may render, in the environment 110 of the user 108, at least one insight from the list of insights that is configured by the subject person 122.

According to examples disclosed herein, the insights rendering and interaction controller 120 that is executed by the at least one hardware processor (e.g., the hardware processor 3102 of FIG. 31, and/or the hardware processor 3304 of FIG. 33) may ascertain, for the subject person 122, a do not disturb status that is associated with an insight associated with the subject person 122, and render, in the environment 110 of the user 108, another insight associated with the subject person 122 that does not include the insight including the do not disturb status associated with the subject person 122.

According to examples disclosed herein, the insights rendering and interaction controller 120 that is executed by the at least one hardware processor (e.g., the hardware processor 3102 of FIG. 31, and/or the hardware processor 3304 of FIG. 33) may ascertain, for the user 108, a list of insights that is configured (e.g., where the user 108 specifies specific insights that may be displayed with respect to the user) by the user from the plurality of insights 114 associated with the user 108, and render, in the environment 110 of the user 108, at least one insight from the list of insights that is configured by the user 108.

According to examples disclosed herein, the workplace understanding analyzer 102 that is executed by the at least one hardware processor (e.g., the hardware processor 3102 of FIG. 31, and/or the hardware processor 3304 of FIG. 33) may identify, in the environment 110 of the user 108, the subject person 122, Further, the insights prioritization analyzer 112 that is executed by the at least one hardware processor (e.g., the hardware processor 3102 of FIG. 31, and/or the hardware processor 3304 of FIG. 33) may determine, based on a shared context that includes a role of the user 108 and a different role of the subject person 122, the plurality of insights 114 associated with the user 108.

According to examples disclosed herein, the insights rendering and interaction controller 120 that is executed by the at least one hardware processor (e.g., the hardware processor 3102 of FIG. 31, and/or the hardware processor 3304 of FIG. 33) may determine, based on the environment 110 of the user 108, whether the at least one insight of the plurality of prioritized insights associated with the user 108 is blocked by another insight of the plurality of prioritized insights associated with the user 108. Further, based on a determination that the at least one insight of the plurality of prioritized insights associated with the user 108 is blocked by the other insight of the plurality of prioritized insights associated with the user 108, the insights rendering and interaction controller 120 may modify a rendered location of the at least one insight of the plurality of prioritized insights associated with the user 108 to not be blocked by the other insight of the plurality of prioritized insights associated with the user 108.

According to examples disclosed herein, the insights prioritization analyzer 112 that is executed by the at least one hardware processor (e.g., the hardware processor 3102 of FIG. 31, and/or the hardware processor 3304 of FIG. 33) may determine, based on the analyzed environment 110 of the user 108, the plurality of insights 114 associated with the user 108 by determining, based on the analyzed environment 110 of the user 108, the plurality of insights 114 that include ticket data insights that represent tasks that are to be performed by the user 108. Further, the insights rendering and interaction controller 120 that is executed by the at least one hardware processor (e.g., the hardware processor 3102 of FIG. 31, and/or the hardware processor 3304 of FIG. 33) may render, in the environment 110 of the user 108, at least one ticket data insight of the ticket data insights.

According to examples disclosed herein, the insights rendering and interaction controller 120 that is executed by the at least one hardware processor (e.g., the hardware processor 3102 of FIG. 31, and/or the hardware processor 3304 of FIG. 33) may render, in the environment 110 of the user 108, the at least one ticket data insight of the ticket data insights by rendering, in the environment 110 of the user 108, the at least one ticket data insight of the ticket data insights to include a shape, a size, and/or a color that represents a priority associated with the at least one ticket data insight.

According to examples disclosed herein, the insights prioritization analyzer 112 that is executed by the at least one hardware processor (e.g., the hardware processor 3102 of FIG. 31, and/or the hardware processor 3304 of FIG. 33) may prioritize the plurality of insights 114 based on the plurality of prioritization criteria that include a number of times and/or a length of time that the user 108 spends analyzing an insight within a specified time duration.

Operation of the apparatus 100 is described in further detail with respect to FIGS. 1-30.

For the apparatus 100, immersive approaches based on mixed reality may provide context, for example, on, where a user (e.g., a project member) wearing a device (e.g., supported technologies as disclosed herein for FIG. 13) is, what is in the field of view, what is he/she focusing at, etc. The user may also be designated as a wearer of a headset (e.g., the device 106) as disclosed herein. This visual context, coupled with the identity and role, and the project context of the user and in-process project information, may be used to annotate the field of view with relevant insights and recommendations, Intelligence augmentations may also be based upon what phase of an overall process the user is in, and the same view may be augmented with different insights or recommendations based upon that. These aspects may form the basis for creating extended reality based immersive project workspaces as disclosed herein.

Figure 2:
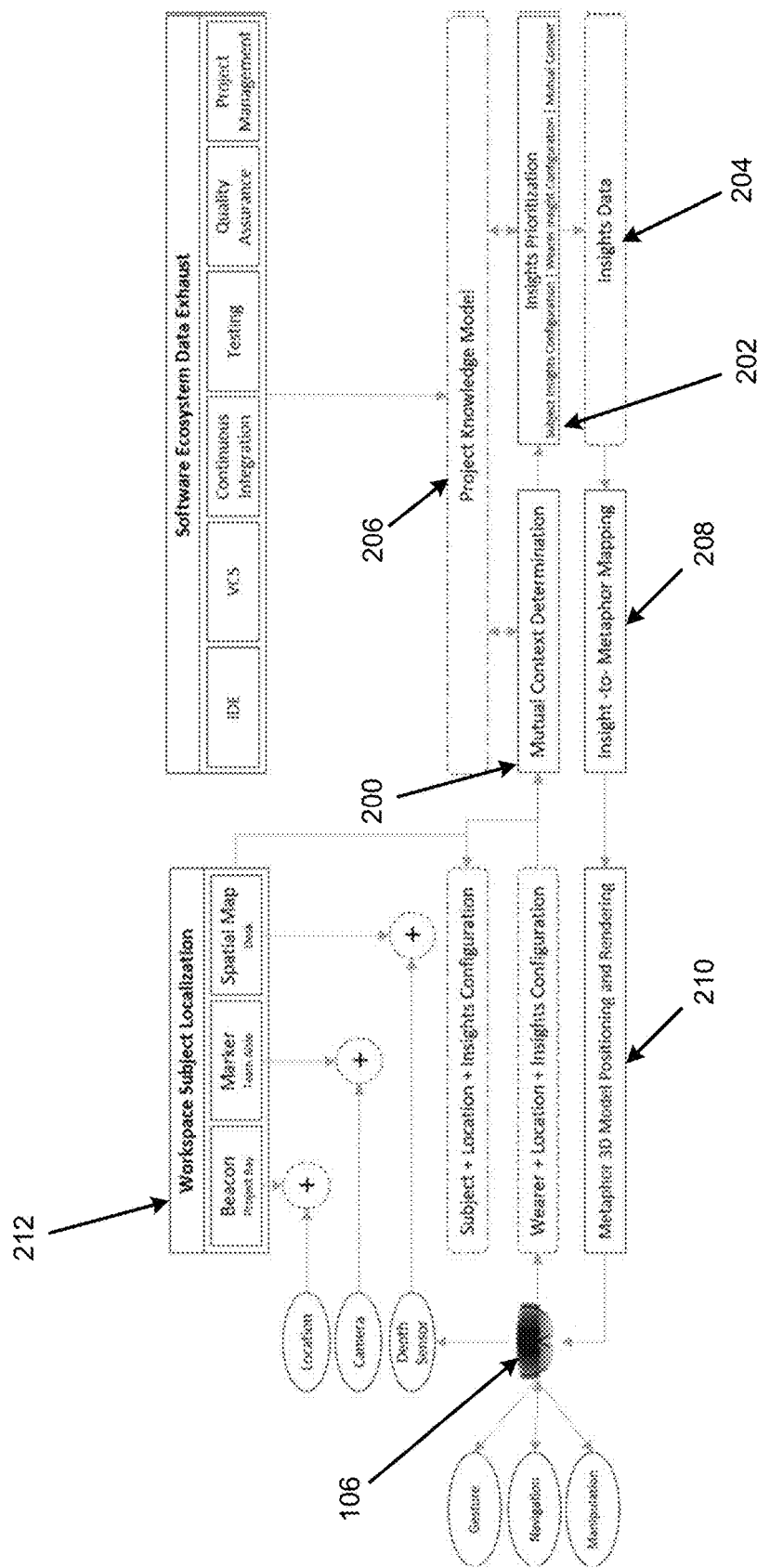
FIG. 2 illustrates an example of implementation of the extended reality based immersive project workspace creation apparatus of FIG. 1 in accordance with an example of the present disclosure.

FIG. 2 illustrates an example of implementation of the apparatus 100 in accordance with an example of the present disclosure.

Referring to FIG. 2, a mixed reality device 106, such as a MICROSOFT HOLOLENS may include multiple sensors (e.g., cameras, depth sensor, Bluetooth, etc.) that may be utilized to estimate the location of the subject(s). A subject (also referred to herein as "subject person") may be described as a person whose metrics/insights are shown to the user 108. For example, in the case of a software development team, a developer may be a subject and the project manager may be the user (e.g., wearer of the device) in the workplace. The mixed reality device 106 may also provide insights configuration for the subject and the user. For example, both the subject and user may configure insights that are to be shown. For example, the subject (a developer) may want to show the user a recent recognition whenever the user passes by the subject's desk. Similarly, a user may configure a list of insights that the user may want to visualize when in the close proximity of the subject (e.g., the subject's code commits statistics for the entire week). While across-the-bay augmentation can be realized by locating aisles and/or workstations using Bluetooth LTE beacons, and associated triangulation processes, the aisle and work desk identification and augmentation may be achieved by leveraging unique markers and spatial mapping, respectively. In this regard, location precision may increase closer towards a user's work desk.

At 200, the mutual context between the user 108 and a subject person 122 may be determined from the location and insights configuration associated with the subject person 122 and user 108. Mutual context may be dependent upon current roles being portrayed by the subject person 122 and user 108. This is because the subject and the user may include changing roles. For example, a user may be a developer in the morning and tester in the afternoon. Hence, the mutual context may provide for determination of relevant insights to be shown to the user at a particular time. The mutual context may be captured, for example, from an application lifecycle management (ALM) tool like JIRA™. The mutual context may include parameters such as reporting hierarchy, current role in the project team, etc. This may be helpful to prioritize insights at 202 and show a default view which may be most pertinent to the user. With respect to insights prioritization that is described in further detail with reference to FIGS. 9 and 18-29, insights prioritization may include prioritizations based upon configurations, alerts, and recommendations.

At 204, insights data may be generated based on the insights prioritization. In this regard, the insights prioritization analyzer 112 may prioritize the insights 114 that need to be shown to the user 108. For example, the insights 114 may include code commit statistics, recognitions, assigned tasks, etc., and may be prioritized in this order (e.g., in order of commit statistics, recognitions, assigned tasks, etc.), or another order specified by the user 108 and/or the subject person 122. Actual real-time data for these insights 114 may be referred to as insights data. For example, for code commit statistics, the insights data may include seven Boolean entries of True and False, pertaining to past seven days of history. Other insights may be depicted using other types of data structures.

Figure 17:
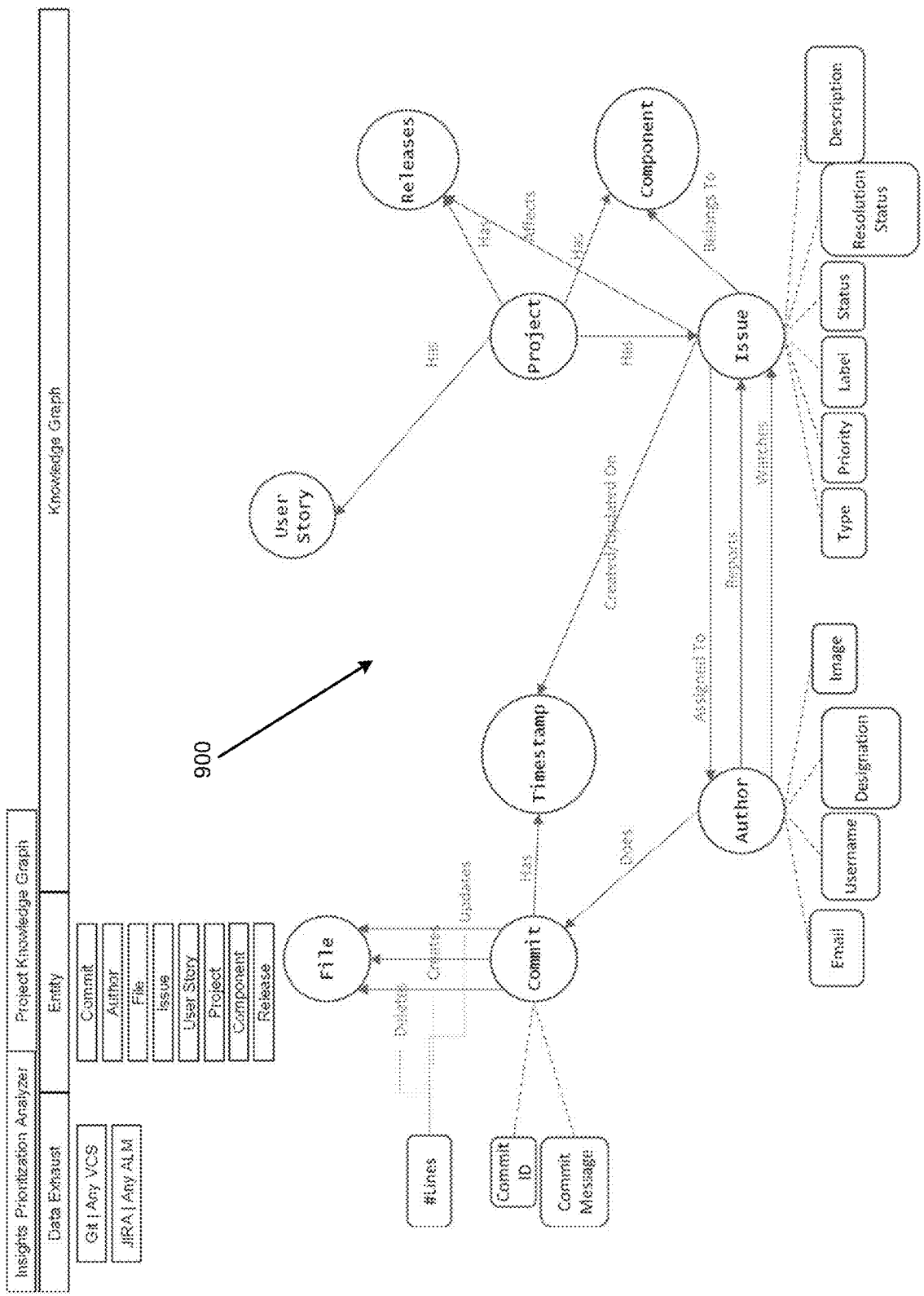
FIG. 17 illustrates a project knowledge graph of the insights prioritization analyzer of the extended reality based immersive project workspace creation apparatus of FIG. 1 in accordance with an example of the present disclosure.

At 206, a project knowledge graph 900 (also referred to as a project knowledge model) may be constructed using the data outputs from multiple heterogeneous tools (e.g., data exhaust) employed in the project environment. For example, the tools may include version control systems, application lifecycle management, integrated development environment, quality control, DevOps, etc. The project knowledge graph 900 may connect and correlate disparate data exhaust entities with each other. The project knowledge graph 900 may be comprised of entities, attributes, and corresponding relationships. For example, a developer entity may be linked with a commit entity using a one-many relationship. For example, the project knowledge graph 900 of FIG. 17 is an instantiation of the data exhaust entities from two categories of tools (e.g., version control system (VCS, such as Git) and ALM (such as JIRA)). This project knowledge graph 900 may be used to extract real-time data for insights. The project knowledge graph 900 may be extended to support other categories of tools. Apart from the mutual context, insights may also be configured according to personal priorities. For example, a subject may want to show a recently received recognition (e.g., as a crown) to each passing mixed reality device user. The prioritized insights and corresponding data may then be sent for further processing on the device itself.

Further processing may be performed on the device 106 as this may represent a visualization centric approach, and the conditions and environment of the device may facilitate modification thereof.

At 208, the insights (e.g., JSON data) may be mapped to equivalent three-dimensional (3D) representations. With respect to mapping to insights 114 to 3D representations, as disclosed herein with respect to FIG. 12, as per the data structure visualization rules repository 1200, this subject matter expert (SME) specified repository may specify mapping for specific data structures to specific visualizations/metaphors. For example, a tickets data insight may be shown using a list data structure, and a list may be converted to a bowl and balls based visualization (e.g., shown in FIG. 3 as 304). In this regard, the bowl may represent an entire list, and the balls may represent specific entries inside the list. Further, the size/color of the balls may represent specific attributes of the list entry such as complexity and priority. For example, the number of open tickets assigned to a developer may be represented using balls placed in a bowl. While the count of balls may be directly proportional to the number of open tickets, the color of the balls may signify ticket severity.

Figure 12:
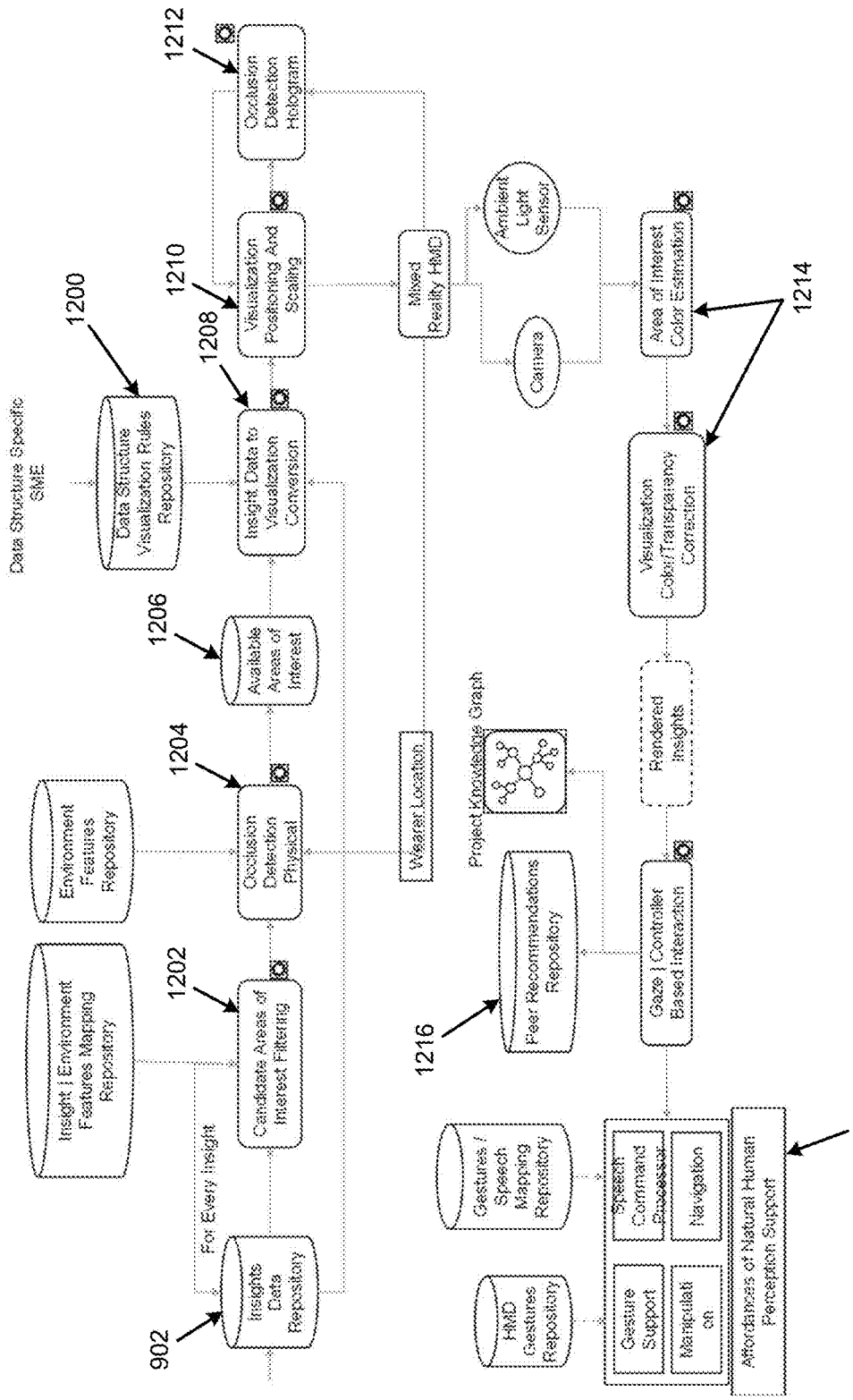
FIG. 12 illustrates an insights rendering and interaction controller of the extended reality based immersive project workspace creation apparatus of FIG. 1 in accordance with an example of the present disclosure.

At 210, according to the relative positions of the user 108 and the subject person 122, the 3D representation may be rendered in the user's field of view (e.g., as disclosed herein with reference to FIG. 12). Further processing may be performed to re-align the rendered 3D representations to not coincide/overlap with real world objects and appear to be part of the environment.

Finally, the user 108 (e.g., the wearer) may utilize various device specific features to interact, manipulate (e.g., rotate, zoom), and move the 3D representations, for better comprehension. In this regard, at 212, workspace subject localization may be implemented by utilizing location, camera, and depth sensor information in conjunction with a beacon, marker, and spatial map, respectively. Once the relevant/prioritized insight is placed in the user's field-of-view, device-specific features/interaction modes such as controllers, gestures, voice commands, and gaze (depending upon the device), may be utilized to support rotation, zooming, and re-placement of the rendered insights. The same features may map to different interaction modes available on different devices.

Figure 3:
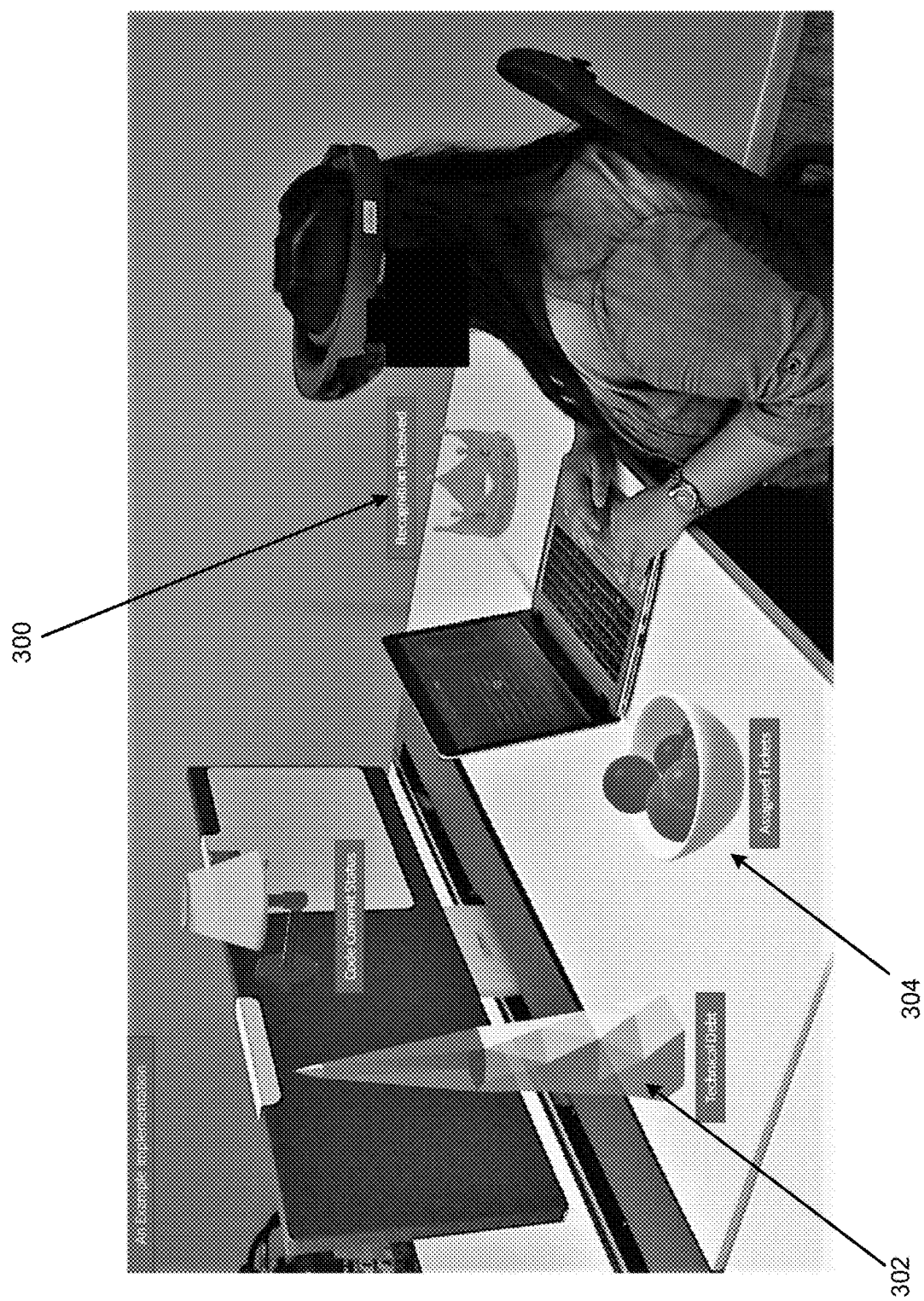
FIG. 3 illustrates desk augmentation based on implementation of the extended reality based immersive project workspace creation apparatus of FIG. 1 in accordance with an example of the present disclosure.

FIG. 3 illustrates desk augmentation based on implementation of the apparatus 100 in accordance with an example of the present disclosure.

Figure 4:
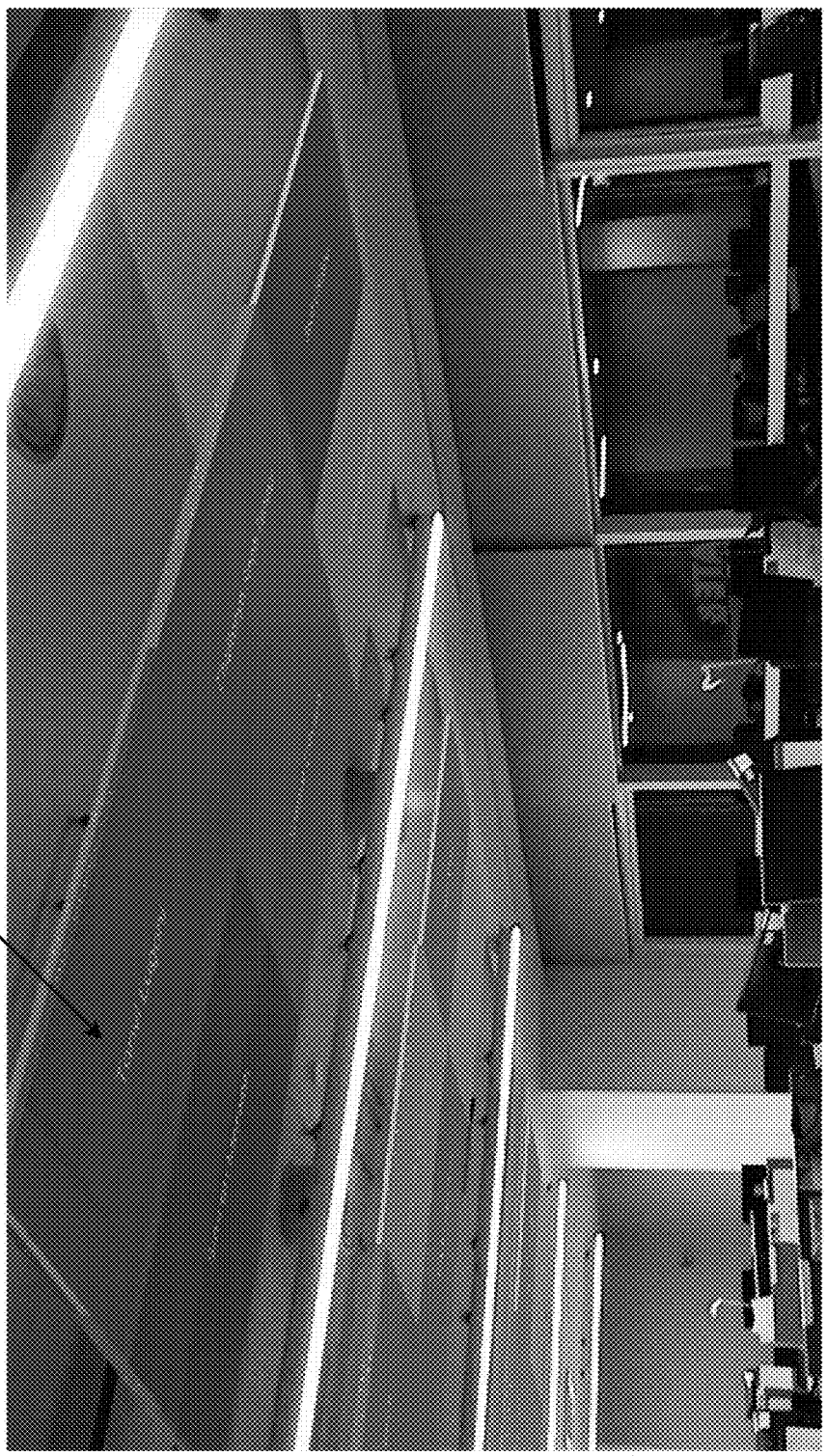
FIG. 4 illustrates bay augmentation based on implementation of the extended reality based immersive project workspace creation apparatus of FIG. 1 in accordance with an example of the present disclosure.

For example, FIG. 3 shows an example of a workstation category of visualization. The crown at 300 may show a recent recognition that may appear just in time, the tower at 302 may grow with the overall technical debt related to the components that the developer is working on, and the balls at 304 in the 3D bowl may represent the tickets assigned to the project member shown. The tower at 302 may represent a metaphorical representation for metric technical debt. In this regard, the higher the technical debt of a particular developer (e.g., the user 108), the higher the tower's height. According to another example, the user (e.g., a manager) may look at multiple developer desks and correlate tower height with developer proficiency (e.g., lower technical debt correlates to a higher performing developer), The balls at 304 with the bowl may represent a metaphorical representation for metric assigned tickets, A developer usually in support mode may be assigned tickets for resolution. The entire bowl may correspond to assigned tickets. Each ball may correspond to a specific assigned ticket. The color of the ball may correspond to the priority of that ticket, FIG. 4 shows an example of an across-the-bay category of visualization. A virtual panel at 400 on the ceiling above the project bay may show an at-a-glance view of a heatmap showing pending user stories assigned to different team members belonging to different clusters within a project. The user 108 may configure that he/she wants to visualize a metric such as tasks assigned to various members of the team, as a team-level insight. Using a depth sensor, a spatial mesh of the entire bay may be generated by the workplace understanding analyzer 102 and the ceiling, as determined by the sensing data 104, may be tagged as an area of interest. A corresponding insight to metaphor mapping may be added in the data structure visualization rules repository 1200. The insights (e.g., tasks assigned) may already be available in a project insights repository 706 (e.g., see FIG. 7). At runtime, when the user 108 approaches the ceiling (which may be determined from sensing data 104 based on real-time localization) where the team is located, the virtual ceiling showcasing the relevant metric may appear as controlled by the insights rendering and interaction controller 120.

Figure 5:
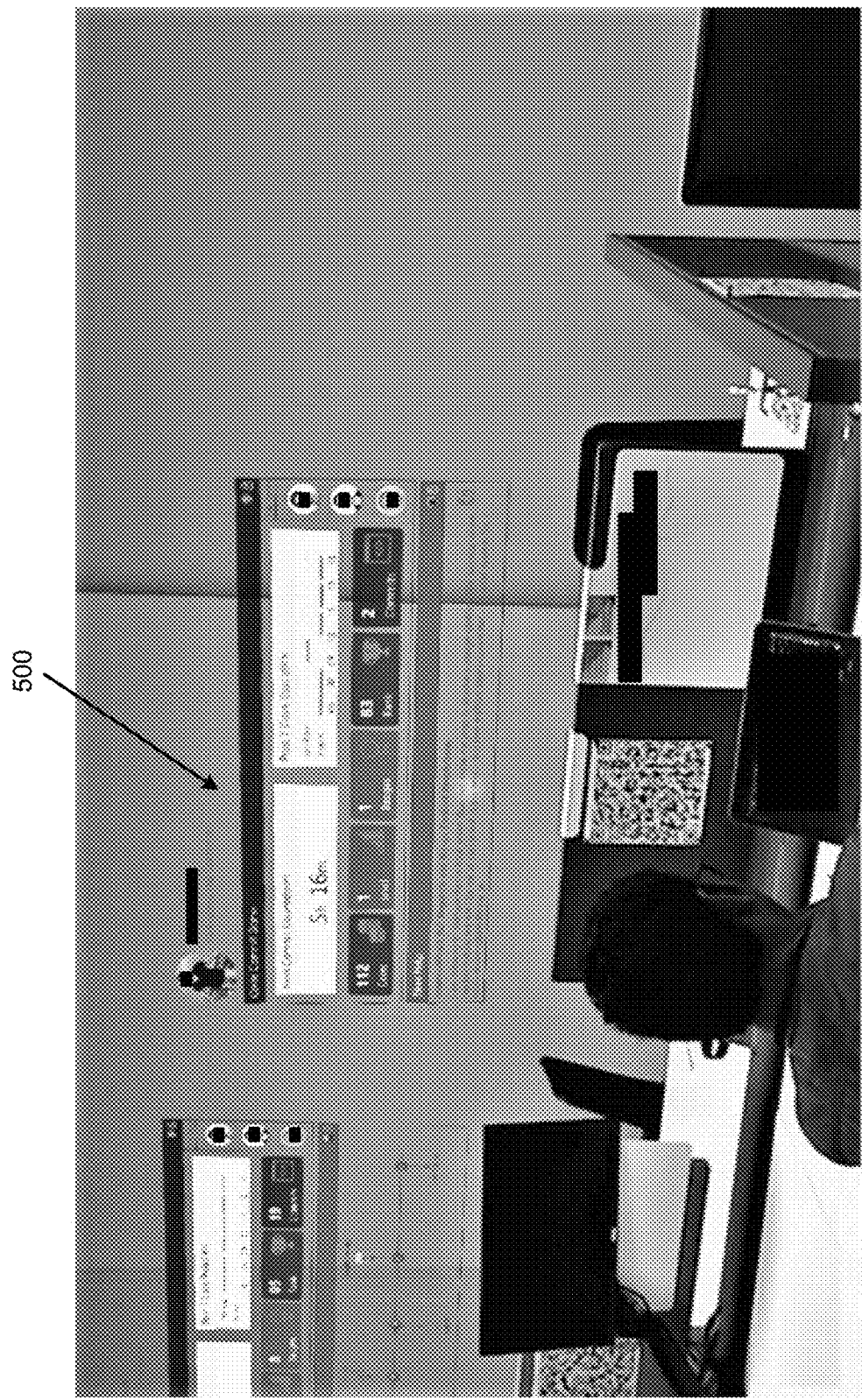
FIG. 5 illustrates aisle augmentation based on implementation of the extended reality based immersive project workspace creation apparatus of FIG. 1 in accordance with an example of the present disclosure.

FIG. 5 shows an example of the specific people and aisle category of visualization as a live screen grab through the device 106. The view of FIG. 5 may show pertinent insights as a 3D informational panel 500 anchored to the partitions in an aisle. This may help the user (e.g., a project lead) to quickly identify the progress and needs for guidance even before reaching a project team members' desk, without disturbing the project team member(s). For the example of FIG. 5, the insights may now change to a subject-specific insight, rather than team-level insight. Further, insight prioritization components may be utilized herein as it is a subject-specific insight. The insights shown in FIG. 5 may be prioritized as disclosed herein with respect to FIGS. 18-29.

Figure 6:
FIG. 6 illustrates gesture based interaction based on implementation of the extended reality based immersive project workspace creation apparatus of FIG. 1 in accordance with an example of the present disclosure.

FIG. 6 illustrates gesture based interaction based on implementation of the apparatus 100 in accordance with an example of the present disclosure.

Referring to FIG. 6, the user may use gestures, such as hand manipulation, eye movement, speaking, etc., to place or otherwise manipulate displayed insights. In this regard, the device 106 may be configured to perform manipulations using different interaction mechanisms available on different devices. For example, a zoom may be performed using voice commands, versus a two hand pinch zoom gesture.

Figure 7:
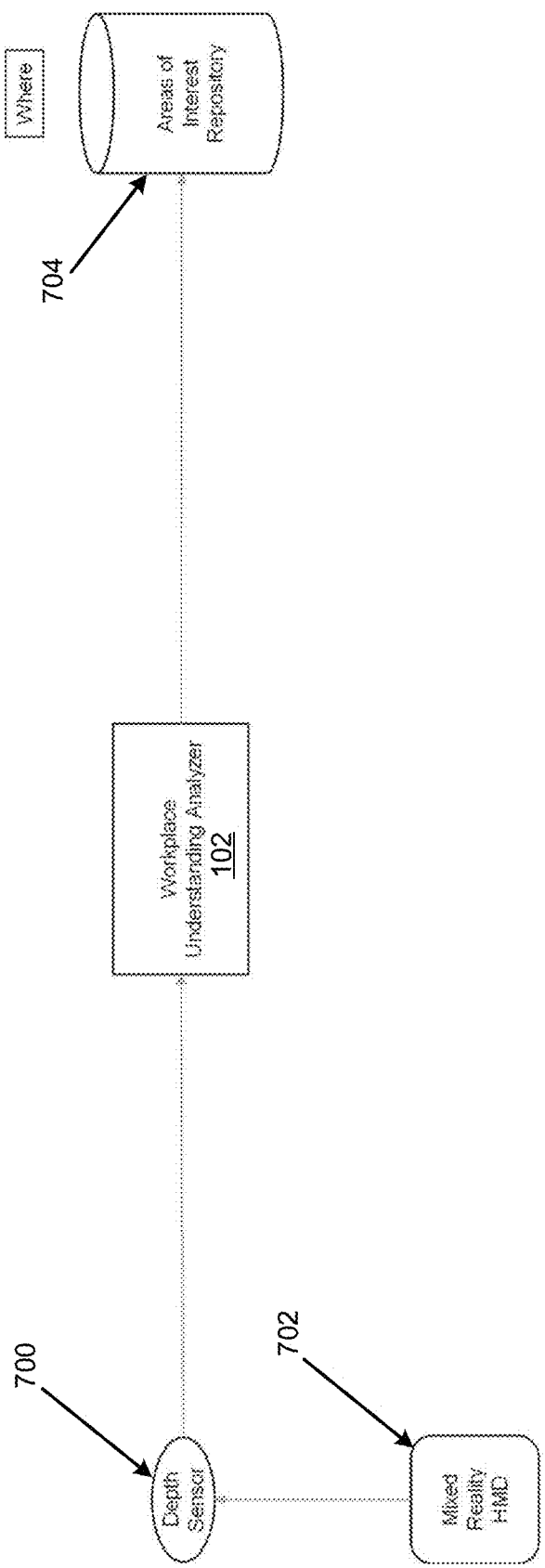
FIG. 7 illustrates an architecture of the extended reality based immersive project workspace creation apparatus of FIG. 1 in accordance with an example of the present disclosure.

FIG. 7 illustrates an architecture of the apparatus 100 in accordance with an example of the present disclosure.

Referring to FIG. 7, the workplace understanding analyzer 102 may obtain sensing data 104 from at least one sensor (e.g., a depth sensor 700) of a device 106 (e.g., a mixed reality head mounted display 702) worn by a user 108. The information obtained by the workplace understanding analyzer 102 may be sent to an areas of interest repository 704 for further analysis. The areas of interest may represent an initial calibration step which allows the subject or the configurer to map the entire workplace and automatically (e.g., using quick response (QR) codes) tag specific areas of interest. For example, developer desks, aisles, bay ceilings, windows, etc., may be tagged as areas of interest. This allows the system to position relevant insights at relevant locations inside the workplace.

Figure 8:
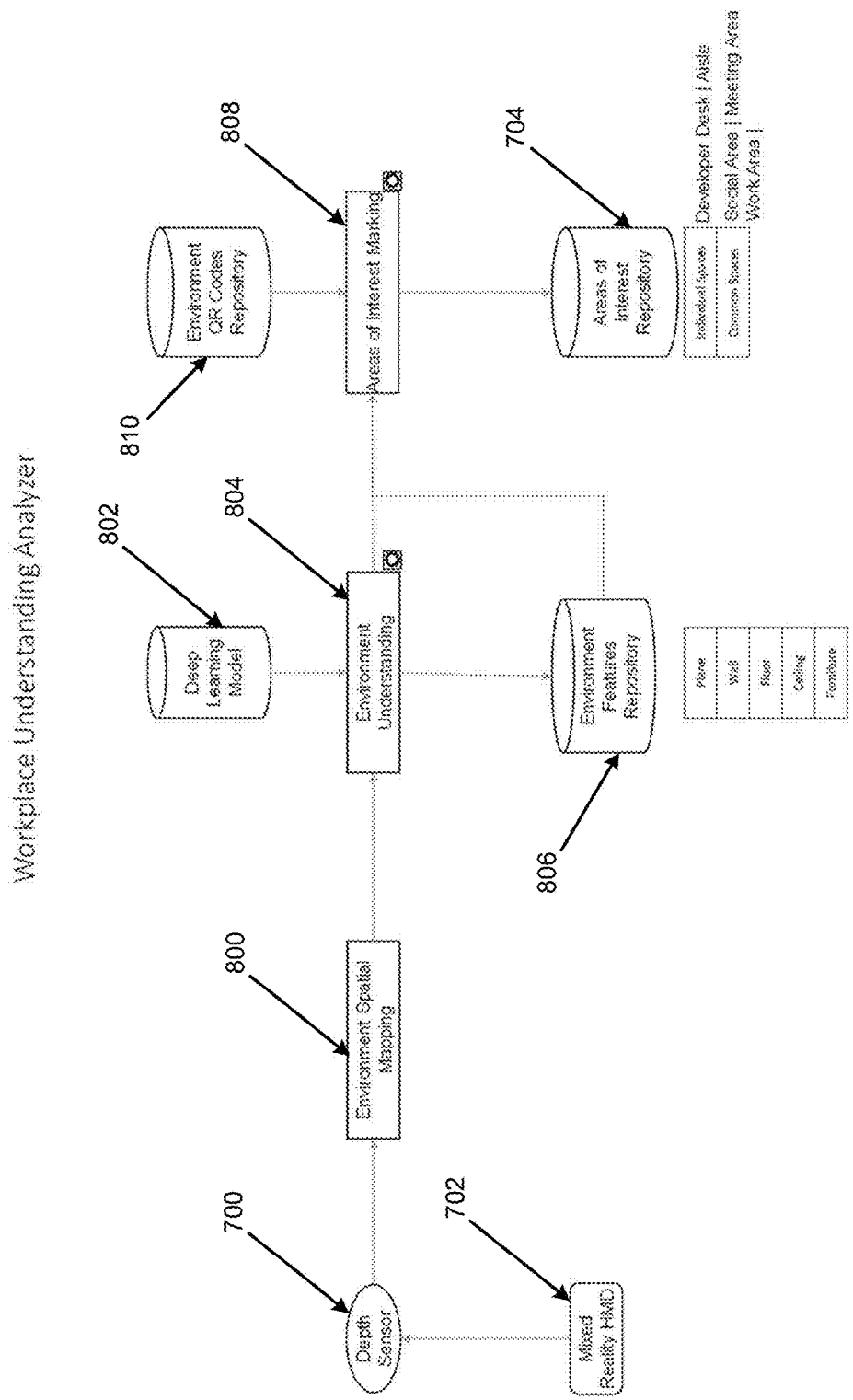
FIG. 8 illustrates a workplace understanding analyzer of the extended reality based immersive project workspace creation apparatus of FIG. 1 in accordance with an example of the present disclosure.

FIG. 8 illustrates a workplace understanding analyzer of the apparatus 100 in accordance with an example of the present disclosure.

Referring to FIGS. 7 and 8, the workplace understanding analyzer 102 may obtain sensing data 104 from at least one sensor (e.g., the depth sensor 700) of a device 106 (e.g., the mixed reality head mounted display 702) to perform environment spatial mapping at 800 (e.g., of spatial mapping of the entire workplace). The environment spatial mapping may be utilized with a deep learning model 802 to perform environment understanding at 804. For example, the environment understanding may include a determination of features of an environment, such as a plane, a wall, a floor, a ceiling, furniture, etc. The environment understanding may be stored in an environment features repository 806. At 808, the workplace understanding analyzer 102 may utilize information from the environment features repository 806, and an environment QR codes repository 810 to perform areas of interest marking. An output from the areas of interest marking 808 may be stored in the areas of interest repository 704. For example, the areas of interest repository 704 may store information such as individual spaces such as a developer desk, aisle, etc., common spaces such as a social area, meeting area, work area, etc. With respect to the deep learning model 802, the environment understanding at 804, the environment features repository 806, the workplace understanding analyzer 102 may take as input the spatial map of the workplace and apply a deep learning model to it to identify various environmental features such as a plane, wall, ceiling, furniture, etc. These features may be eventually used to place insights at correct locations without any occlusion. With respect to the areas of interest repository 704, the areas of interest marking 808, and the environment QR codes repository 810, once the environment features are identified, QR codes and other marker identifiers may allow for tagging of the specific feature to a specific subject or team, such as a developer's desk, social meetup area, etc. This may provide for placing of specific insights at relevant places, for example, developer specific insights on a developer desk, and team-related insights on social areas or across the bay ceiling, etc.

Figure 9:
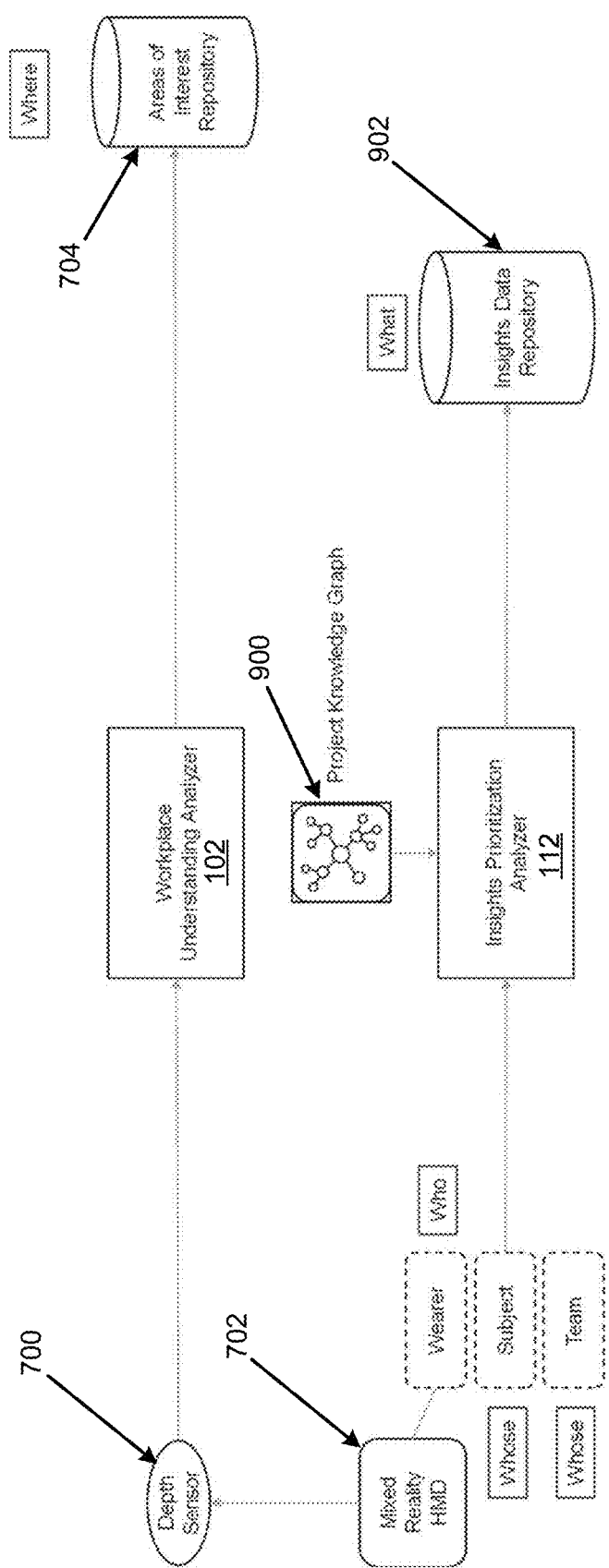
FIG. 9 illustrates further details of the architecture of the extended reality based immersive project workspace creation apparatus of FIG. 1 in accordance with an example of the present disclosure.

FIG. 9 illustrates further details of the architecture of the apparatus 100 in accordance with an example of the present disclosure.

Referring to FIG. 9, the insights prioritization analyzer 112 may utilize a project knowledge graph 900 to determine, from information determined from the device 106 (e.g., the mixed reality head mounted display 702), information for an insights data repository 902. For example, the information from the device 106 may include information related to the wearer (e.g., the user 108), a subject, and a team, which may be analyzed with respect to the project knowledge graph to determine "what" information.

Figure 10:
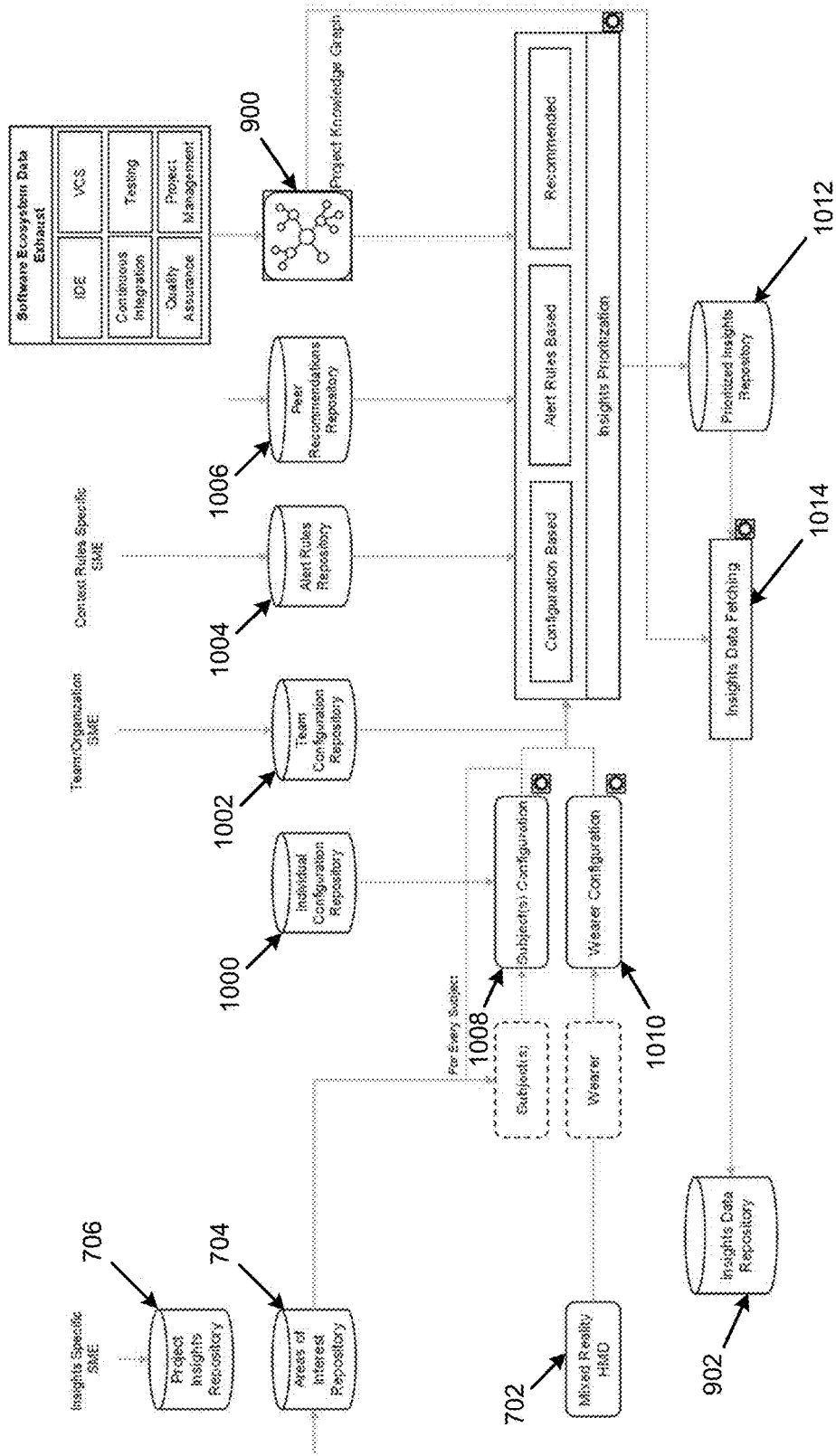
FIG. 10 illustrates an insights prioritization analyzer of the extended reality based immersive project workspace creation apparatus of FIG. 1 in accordance with an example of the present disclosure.

FIG. 10 illustrates an insights prioritization analyzer of the apparatus 100 in accordance with an example of the present disclosure.

Referring to FIG. 10, the insights prioritization analyzer 112 may determine, based on the analyzed environment 110 of the user 108, the plurality of insights 114 associated with the user 108. Further, the insights prioritization analyzer 112 may prioritize the plurality of insights 114 based on a plurality of prioritization criteria 116. The insights prioritization analyzer 112 may analyze information from an individual configuration repository 1000, a team configuration repository 1002, an alert rules repository 1004, a peer recommendations repository 1006, and the project knowledge graph 900 to perform insights prioritization. In this regard, the insights prioritization analyzer 112 may perform configuration based, alert rules-based, and recommended analysis with respect to a subject configuration 1008, and a wearer configuration 1010 to prioritize the plurality of insights 114. The prioritized insights may be stored in a prioritize insights repository 1012. In this regard, information from the prioritized insights repository 1012 and the project knowledge graph 900 may be used to perform insights data fetching at 1014, and the resulting information may be stored in the insights data repository 902. The insights prioritization analyzer 112 may use the current location of the user 108 and determine areas-of-interest and subjects in the user's field-of-view. If any insights are to be showcased on those areas-of-interest, they are then rendered in user's field-of-view. In this regard, the who, for example, may represent the user (e.g., wearer, such as a project manager), the whose may represent the subject (e.g., a developer or a team), and the what may represent insights that need to be shown to the user 108.

Figure 11:
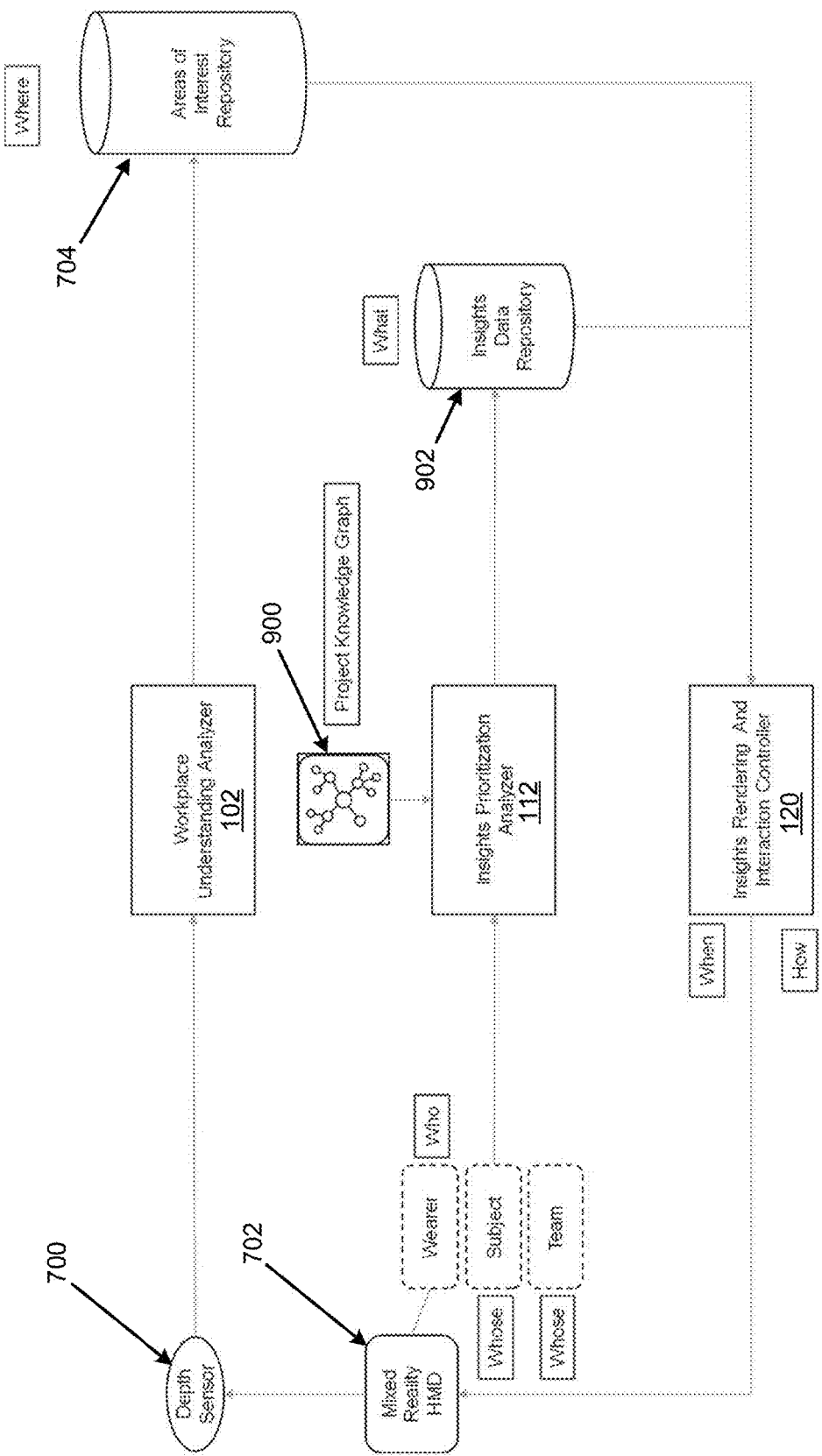
FIG. 11 illustrates further details of the architecture of the extended reality based immersive project workspace creation apparatus of FIG. 1 in accordance with an example of the present disclosure.

FIG. 11 illustrates further details of the architecture of the apparatus 100 in accordance with an example of the present disclosure.

Referring to FIG. 11, the insights rendering and interaction controller 120 that is executed by the at least one hardware processor (e.g., the hardware processor 3102 of FIG. 31, and/or the hardware processor 3304 of FIG. 33) may render, in the environment 110 of the user 108, at least one insight of the plurality of prioritized insights 114 associated with the user 108. Further, the insights rendering and interaction controller 120 may control, based on an interaction of the user 108 with the rendered at least one insight, the rendering of the at least one insight.

FIG. 12 illustrates an insights rendering and interaction controller of the apparatus 100 in accordance with an example of the present disclosure.

Referring to FIGS. 7-12, the aspects of who, whose, what, where, when, and how may be utilized to explain the features of FIGS. 7-12. For example, a user 108 (e.g., a wearer) may represent the one "who" is wearing the extended reality device and is able to visualize and comprehend the insights 114. A subject may represent the one "whose" insights are shown to the user. "What" insights corresponding to the subject may be shown to the user. The workplace location may represent "where" in the workplace the insights are shown. The time, position, and orientation may represent "when" should the insights regarding the subject become visible to the user. Finally, the "how" may represent how should the insights be rendered and positioned for effective comprehension, With respect to candidate areas of interest filtering at 1202, not each insight may be mapped to every area-of-interest. Hence, for the insights in the insights data repository (902), a candidate list of the potential list of areas-of-interest may be determined. With respect to occlusion detection (physical) at 1204, from where the user 108 is standing and looking at, the insights rendering and interaction controller 120 may analyze whether a specific candidate area of interest is even visible of not (e.g., if there is a wall in between or some furniture). Available areas of interest 1206 may include areas of interest that are suitable for the insight, as well as not obstructed/occluded by any environmental feature, and thus an insight may be rendered here. With respect to insight data to visualization conversion 1208, as per the data structure visualization rules repository 1200, insight data to visualization conversion may perform conversion for specific data structures to specific visualizations/metaphors. Visualization positioning and scaling 1210 may provide for rendering of the insight at the filtered area of interest and scaling of the insight to fill (or centered or any configuration) the area of interest. With respect to the occlusion detection (hologram) 1212, after placement of the insight, the insights rendering and interaction controller 120 may determine whether the insight (e.g., virtual hologram) is obstructing/occluding another insight, and if so, the insights rendering and interaction controller 120 may position and/or scale the insight to minimize occlusion. At 1214, with respect to the area of interest color estimation and visualization color and transparency control, a white color text on a white wall may not be visible. Hence, by using camera red, green, and blue frames, the color of the area of interest may be determined, and a contrasting color may be used to showcase the insight. Similarly, since insights are placed in the real-world, transparency may be a relevant factor. If the lighting is very high, the insight may need to be more bright and opaque for better comprehension. With respect to peer recommendation repository 1216, if the user 108 looks at the automatically recommended insight and spends time analyzing the insight, the various counts as disclosed herein with respect to FIG. 29 may change to add that insights as a more probable insight to be shown in the future. With respect to affordances of natural human perception at 1218, once the relevant/prioritized insight is placed in the user's field-of-view, device-specific features/interaction modes such as controllers, gestures, voice commands, and gaze (depending upon the device), may be utilized to support rotation, zooming, and re-placement of the rendered insights. The same features may map to different interaction modes available on different devices.

Figure 13:
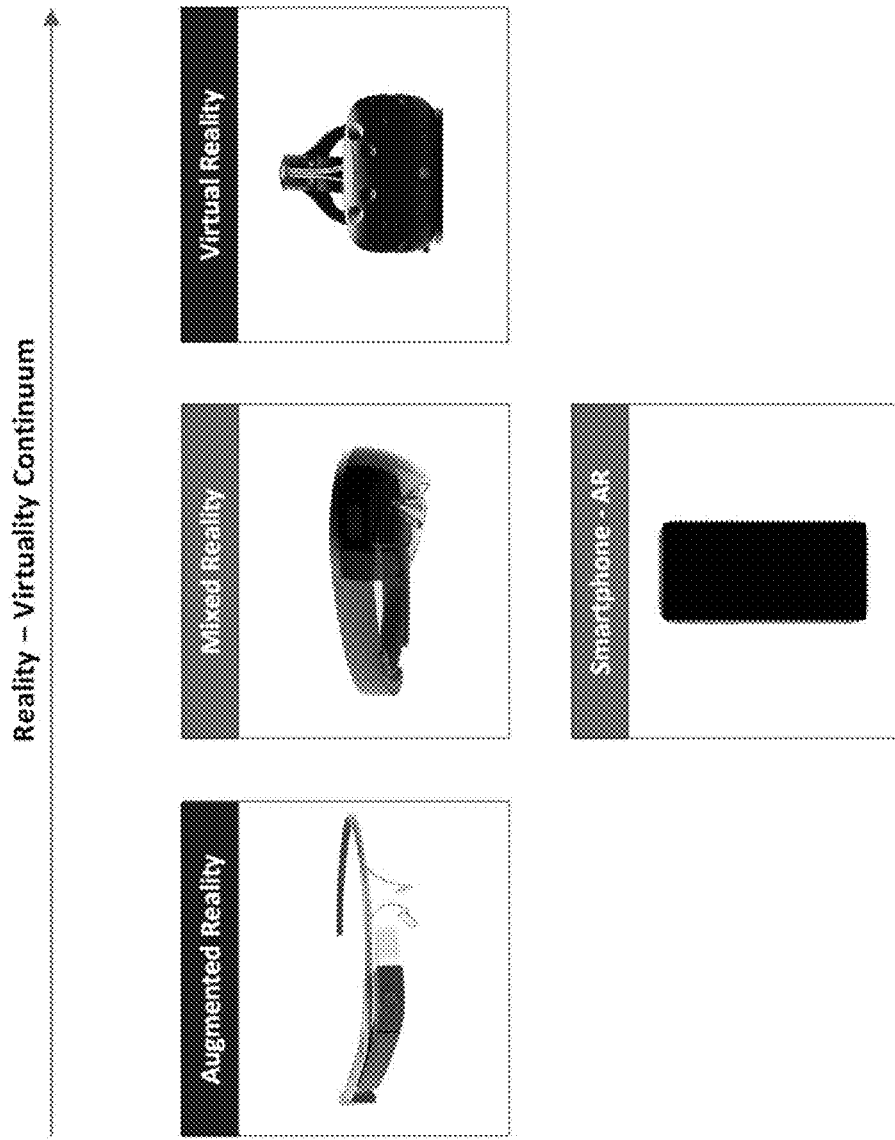
FIG. 13 illustrates examples of supported technologies for the extended reality based immersive project workspace creation apparatus of FIG. 1 in accordance with an example of the present disclosure.

FIG. 13 illustrates examples of supported technologies for the apparatus 100 in accordance with an example of the present disclosure.

Referring to FIG. 13, examples of supported technologies may include augmented reality (AR) glasses, mixed reality (MR) glasses, virtual reality (VR) devices, smartphones, and other such devices.

Figure 14:
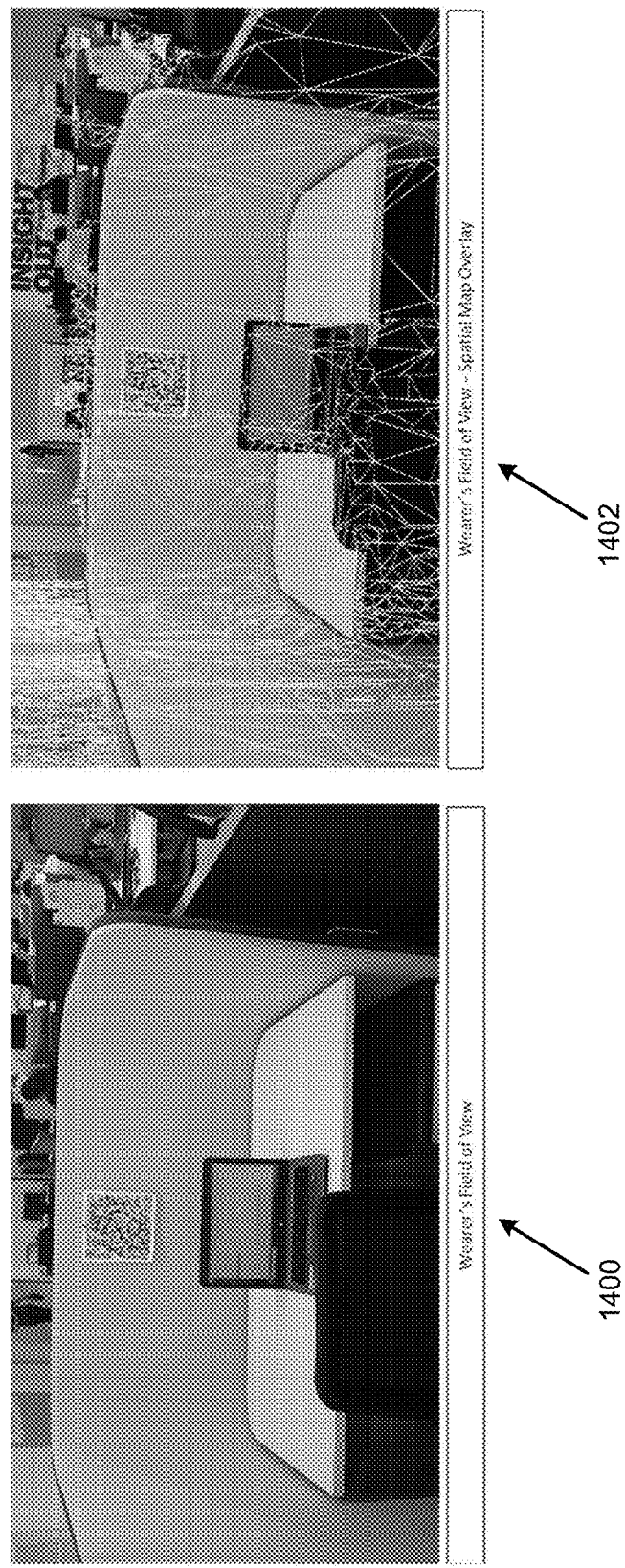
FIG. 14 illustrates environment spatial mapping by the workplace understanding analyzer of the extended reality based immersive project workspace creation apparatus of FIG. 1 in accordance with an example of the present disclosure.

FIG. 14 illustrates environment spatial mapping by the workplace understanding analyzer of the apparatus 100 in accordance with an example of the present disclosure.

A user's (e.g., wearer's) field of view at 1400, and a spatial map overlay for the user's field of view at 1402. The spatial mapping may be utilized to overlay relevant representations of the relevant insights onto and/or around the user, Spatial mapping may be used by the device 106 to create a virtual mesh of the entire workplace and then process the mesh to identify features and areas-of-interest, FIG. 15 illustrates environment understanding by the workplace understanding analyzer of the apparatus 100 in accordance with an example of the present disclosure.

Figure 15:
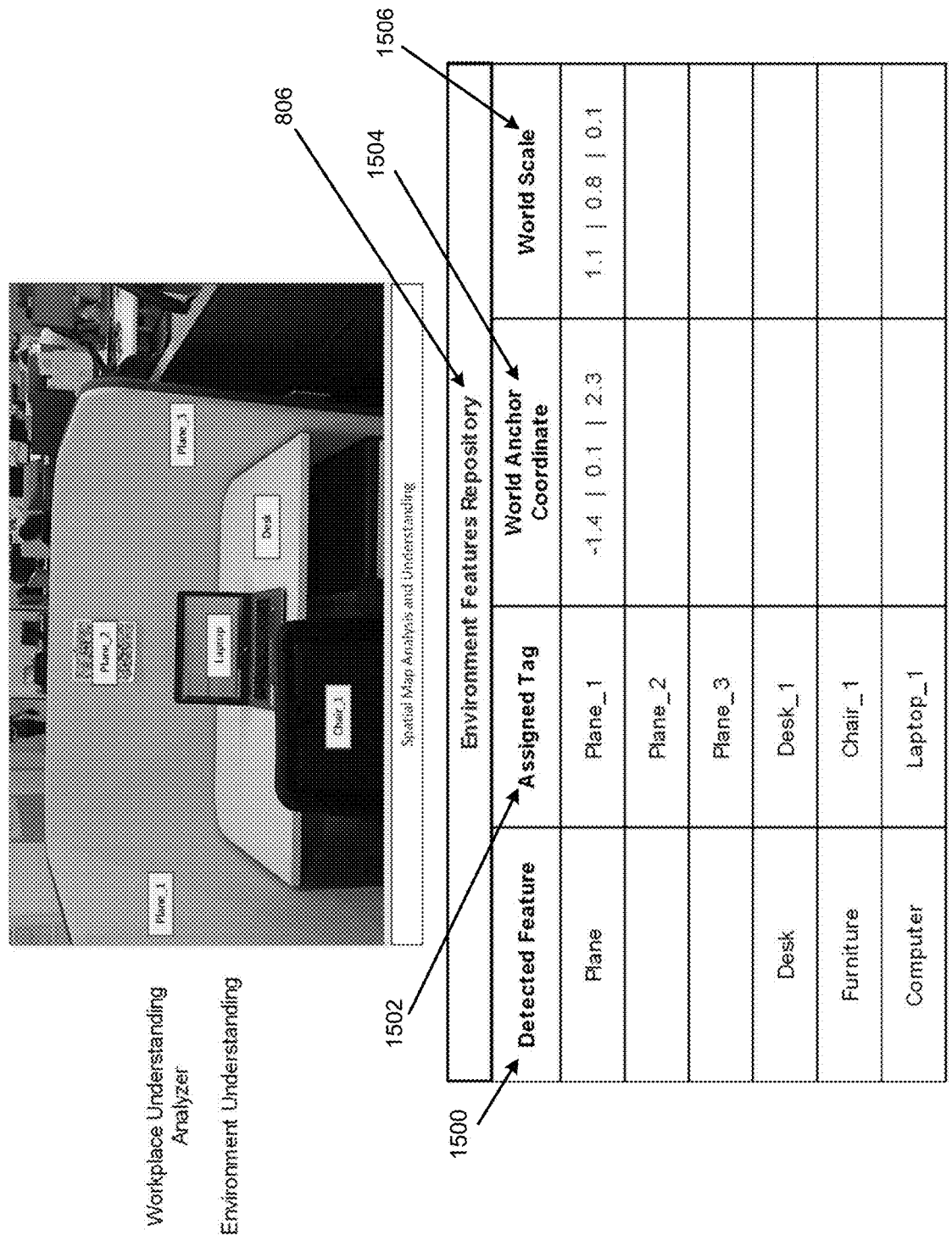
FIG. 15 illustrates environment understanding by the workplace understanding analyzer of the extended reality based immersive project workspace creation apparatus of FIG. 1 in accordance with an example of the present disclosure.

Referring to FIG. 15, an example of the environment features repository 806 is illustrated. The environment features repository 806 may include, for example, a detected feature list at 1500, an assigned tag 1502, world anchor coordinate 1504, and world scale 1506. The detected feature list at 1500 may include features detected in the environment, such as plane, furniture, wall, window, etc. The assigned tag 1502 may represent tags that are assigned to differentiate between all the features in the environment, With respect to the world anchor coordinate, an application starting point may be considered as (0,0,0) (Cartesian coordinate system), the world anchor coordinate 1504 may provide information about the world coordinate of detected features. For example, a point (1,1,1) on an axis of (x,y,z) may be 1 meter in front, 1 meter above, and 1 meter away from the point (0,0,0). Further, the world scale 1506 may provide information about the scale of the detected feature (e.g., how long, wide, and deep the detected feature is). All of these features may be the output by the workplace understanding analyzer 102. After this detection by the workplace understanding analyzer 102, insights may be appropriately scaled and rendered at exact positions of these detected features, FIG. 16 illustrates areas of interest marking by the workplace understanding analyzer of the apparatus 100 in accordance with an example of the present disclosure.

Figure 16:
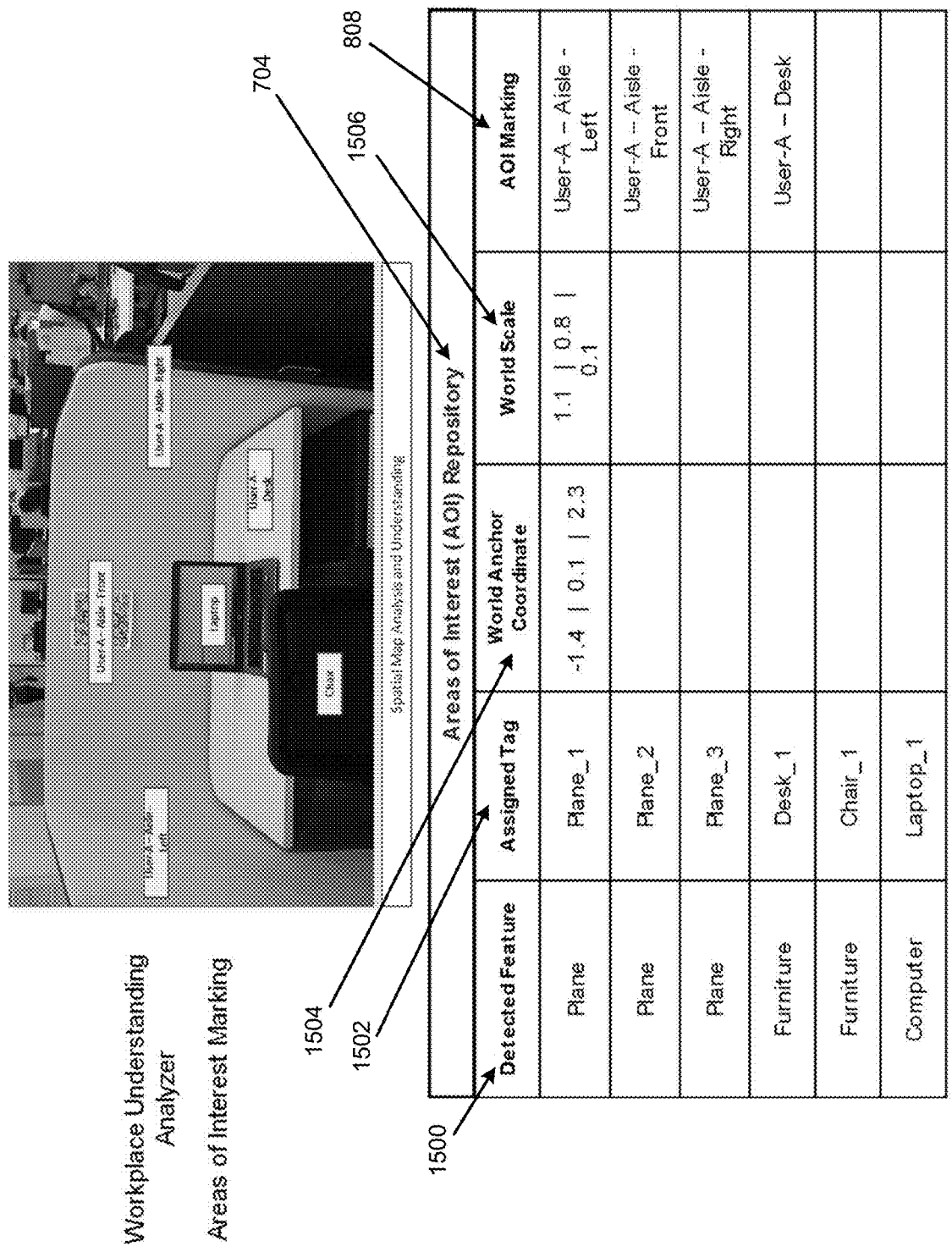
FIG. 16 illustrates areas of interest marking by the workplace understanding analyzer of the extended reality based immersive project workspace creation apparatus of FIG. 1 in accordance with an example of the present disclosure.

Referring to FIG. 16, an example of the areas of interest repository 704 is illustrated. The areas of interest repository 704 may include, for example, the detected feature list at 1500, the assigned tag 1502, the world anchor coordinate 1504, and the world scale 1506, and an areas of interest marking 808.

FIG. 17 illustrates a project knowledge graph of the insights prioritization analyzer of the apparatus 100 in accordance with an example of the present disclosure.

Referring to FIG. 17, the project knowledge graph 900 may be utilized by the insights prioritization analyzer 112. As disclosed herein, the project knowledge graph 900 may be constructed using the data outputs from multiple heterogeneous tools (e.g., data exhaust) employed in the project environment. For example, the tools may include version control systems, application lifecycle management, integrated development environment, quality control, DevOps, etc. The project knowledge graph 900 may connect and correlate disparate data exhaust entities with each other. The project knowledge graph 900 may be comprised of entities, attributes, and corresponding relationships. For example, a developer entity may be linked with a commit entity using a one-many relationship. For example, the project knowledge graph 900 of FIG. 17 is an instantiation of the data exhaust entities from two categories of tools (e.g., version control system (VCS, such as Git) and ALM (such as JIRA)). This project knowledge graph 900 may be used to extract real-time data for insights. The project knowledge graph 900 may be extended to support other categories of tools. The insights prioritization analyzer 112 may utilize the project knowledge graph 900 to identify the current role of the user 108 and the subject person 122 (e.g., mutual context). The insights prioritization analyzer 112 may utilize the project knowledge graph 900 to determine if any alert rules based insights apply to the context (e.g., as disclosed herein with respect to FIG. 28). Further, the insights prioritization analyzer 112 may utilize the project knowledge graph 900 to fetch insights data (e.g., 1014 at FIG. 10).

FIGS. 18-29 illustrate a use case on how insights prioritization is achieved using the apparatus 100. FIGS. 25-29 illustrate in depth details of the insights prioritization analyzer of FIG. 10.

Figure 18:
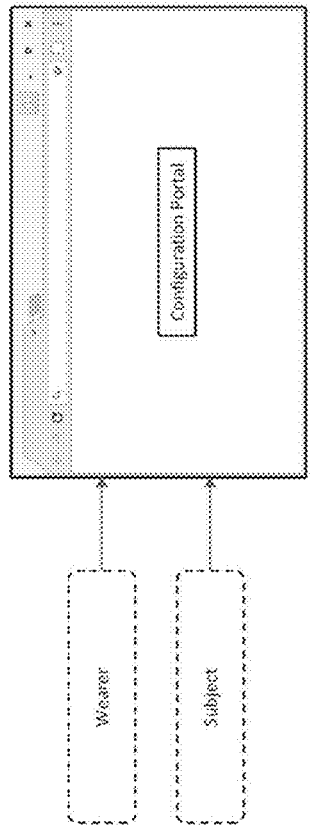
FIG. 18 illustrates individual configuration management for the insights prioritization analyzer of the extended reality based immersive project workspace creation apparatus of FIG. 1 in accordance with an example of the present disclosure.
Figure 20:
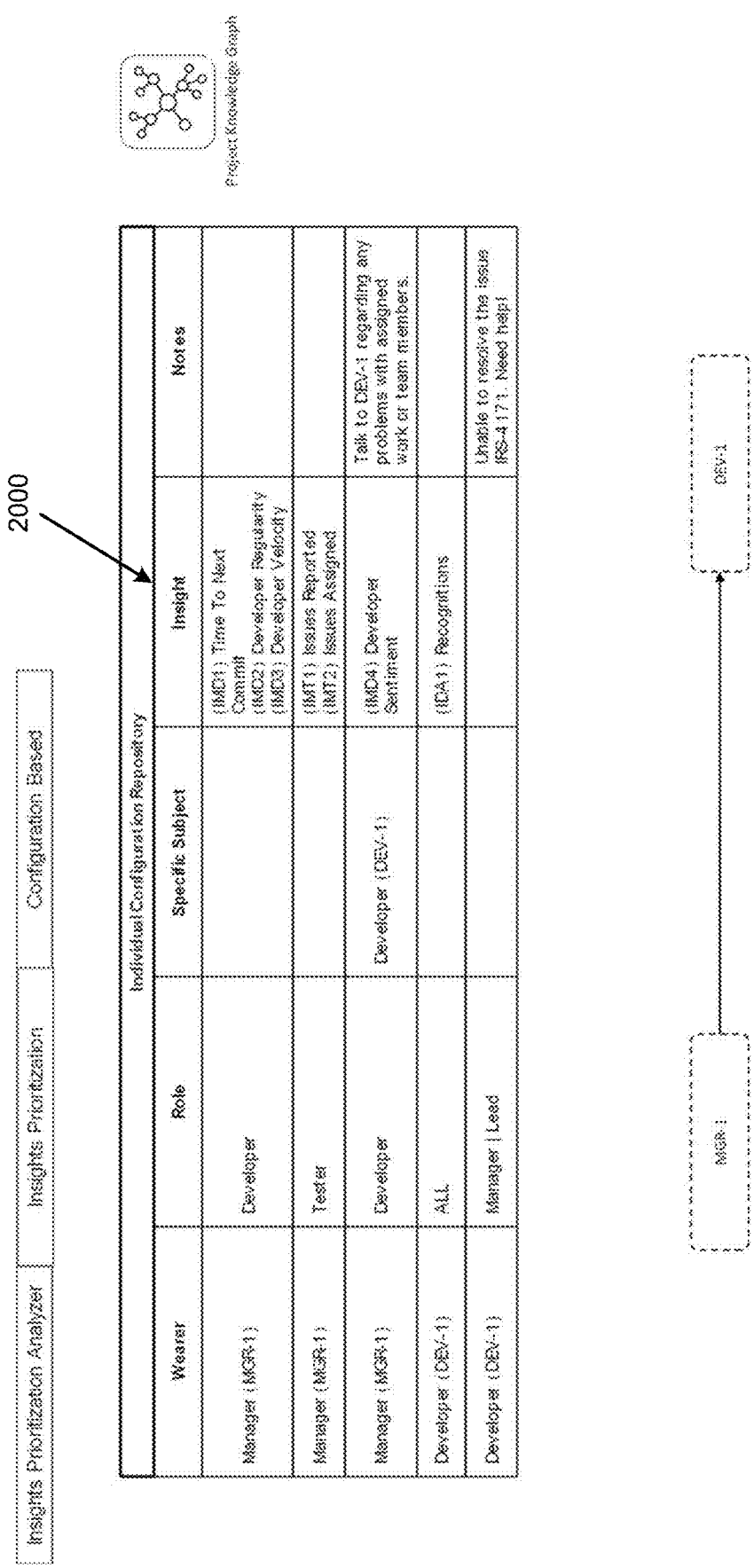
Figure 21:
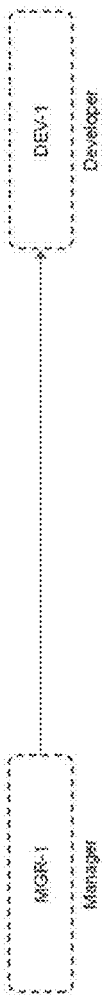
Figure 22:
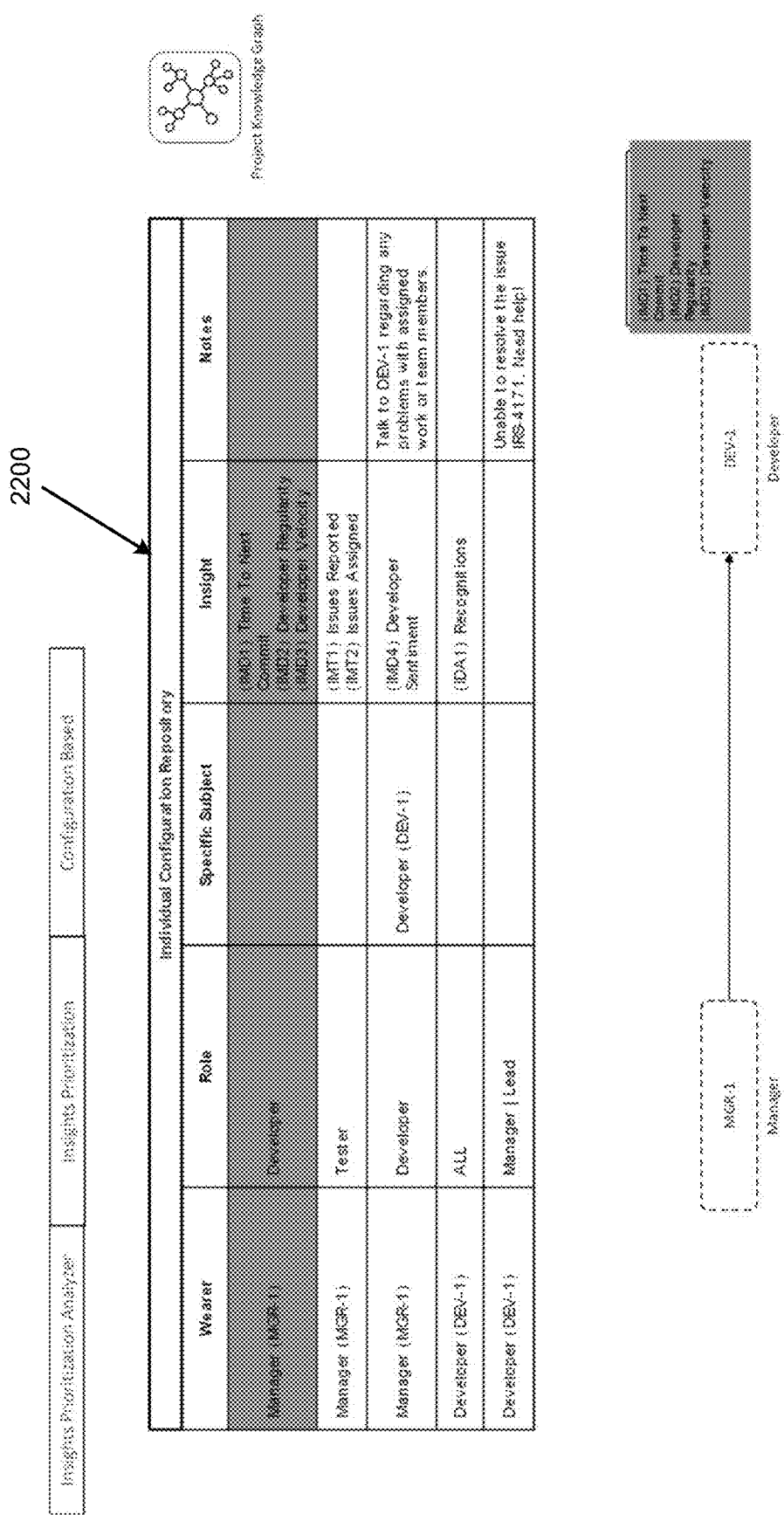
Figure 23:
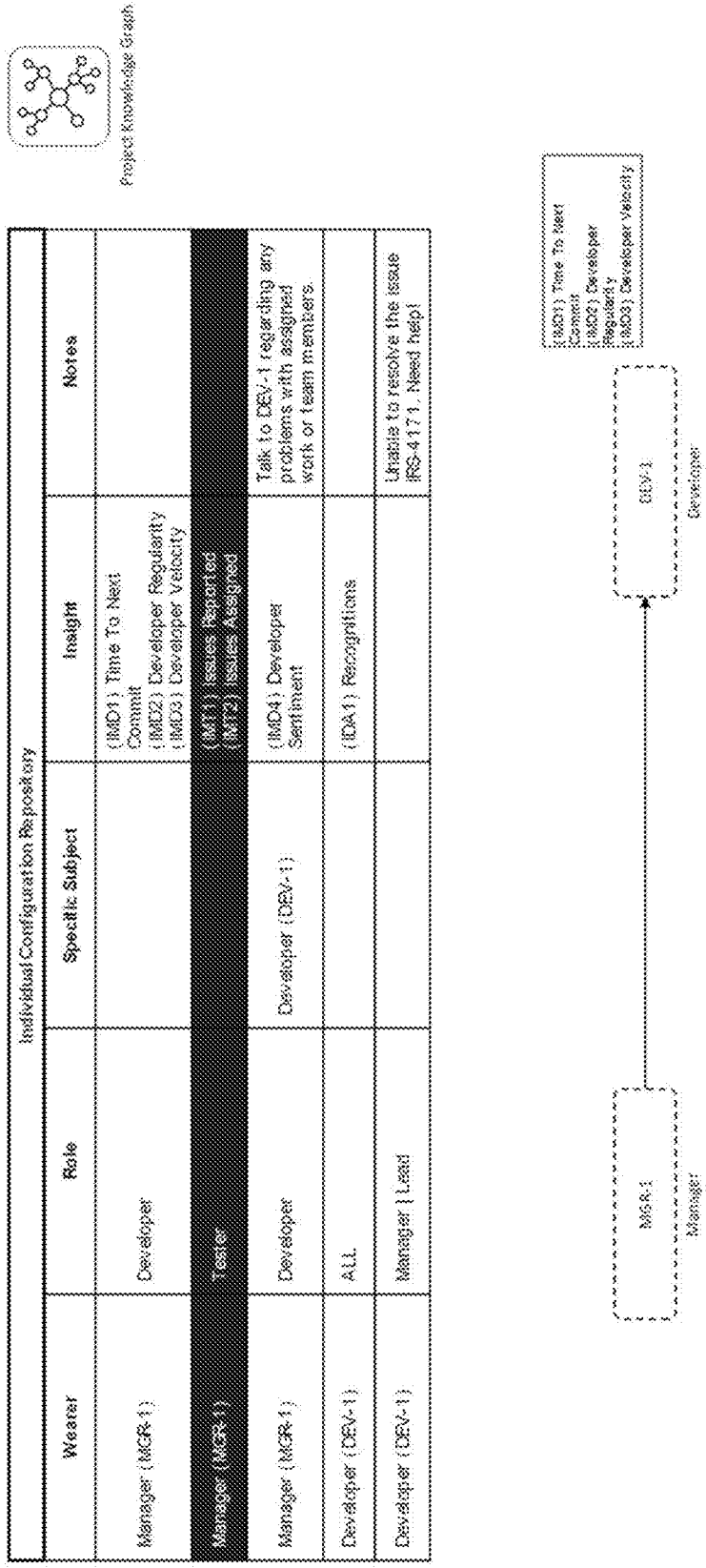
Figure 24:
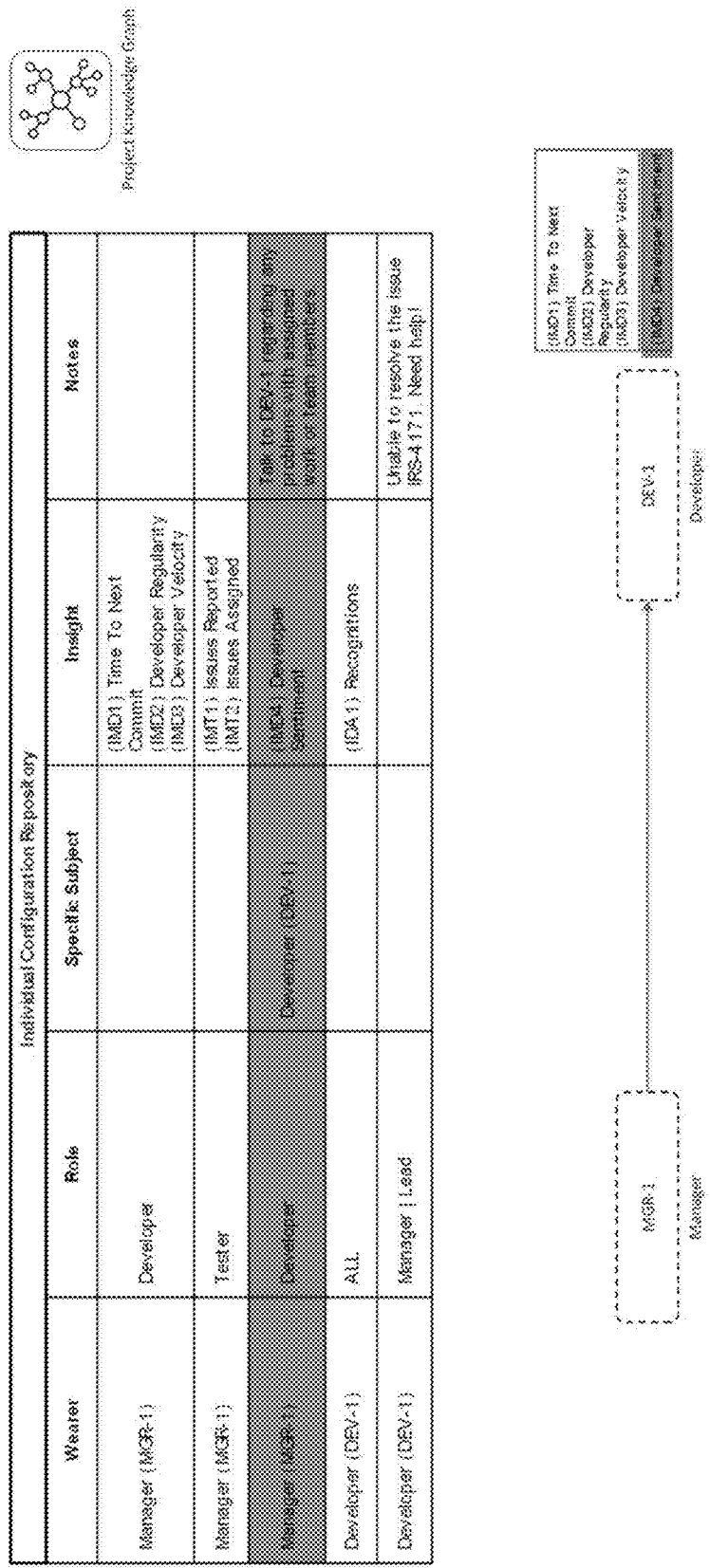
Figure 25:
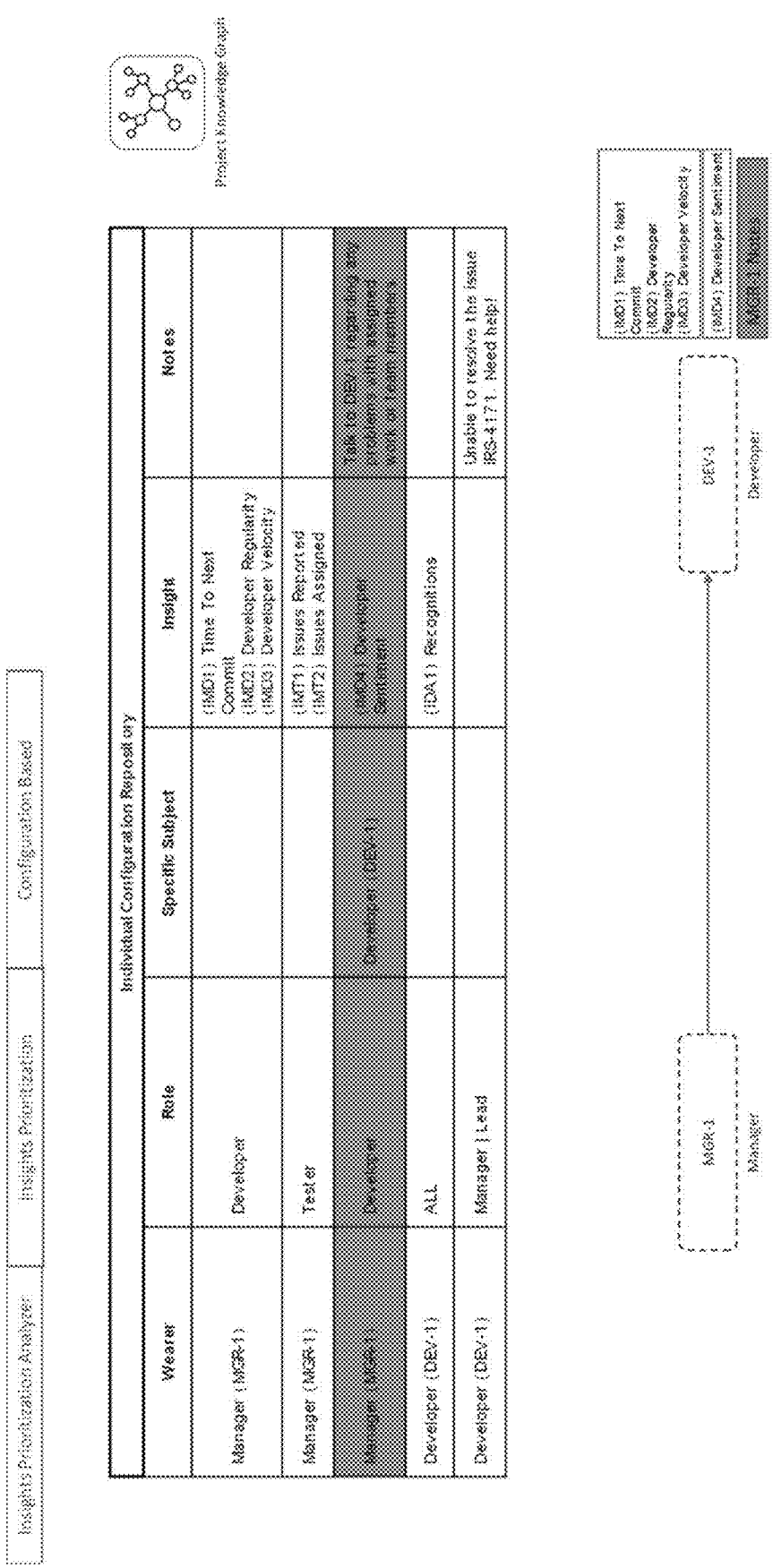
Figure 26:
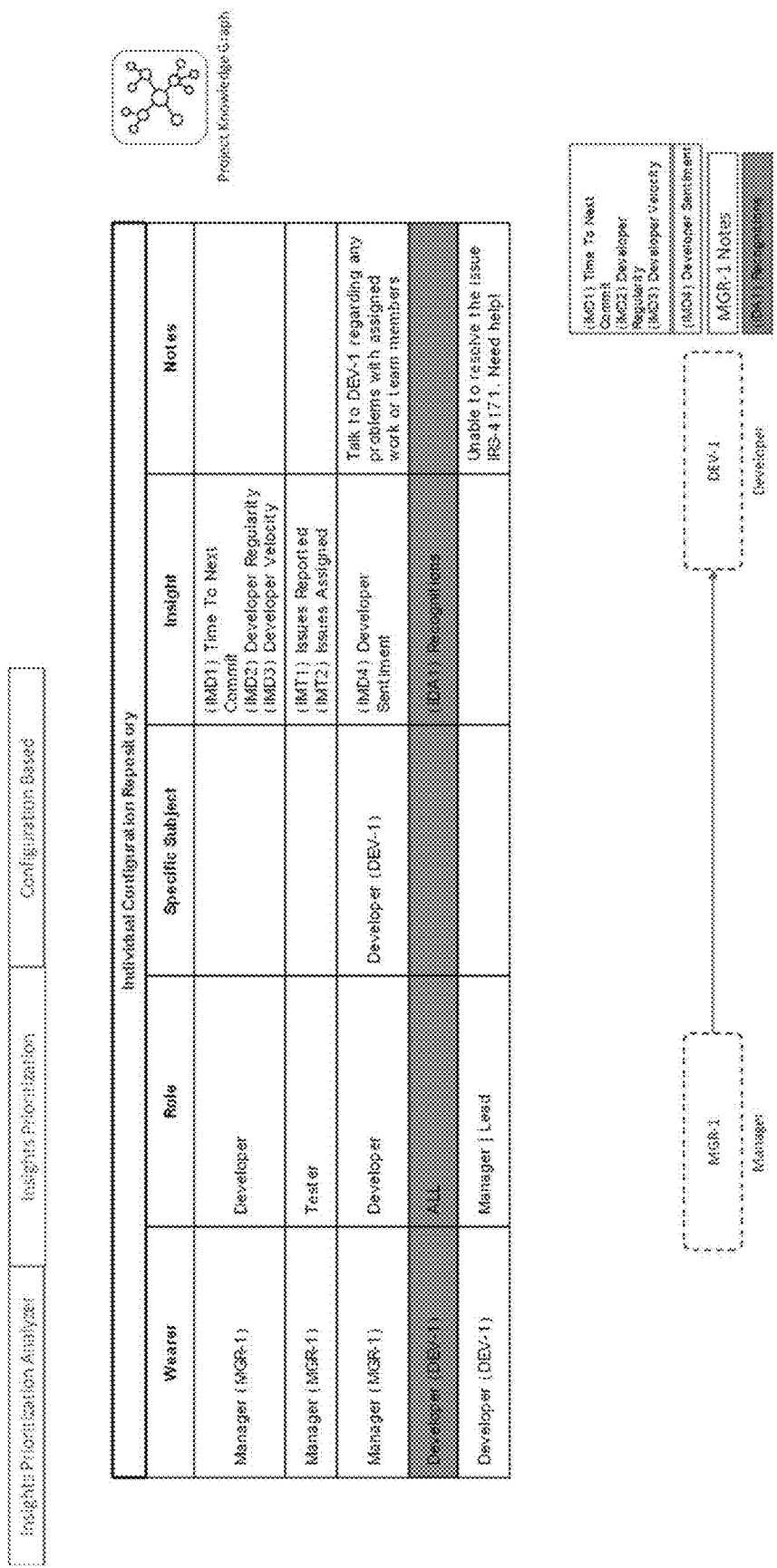
Figure 27:
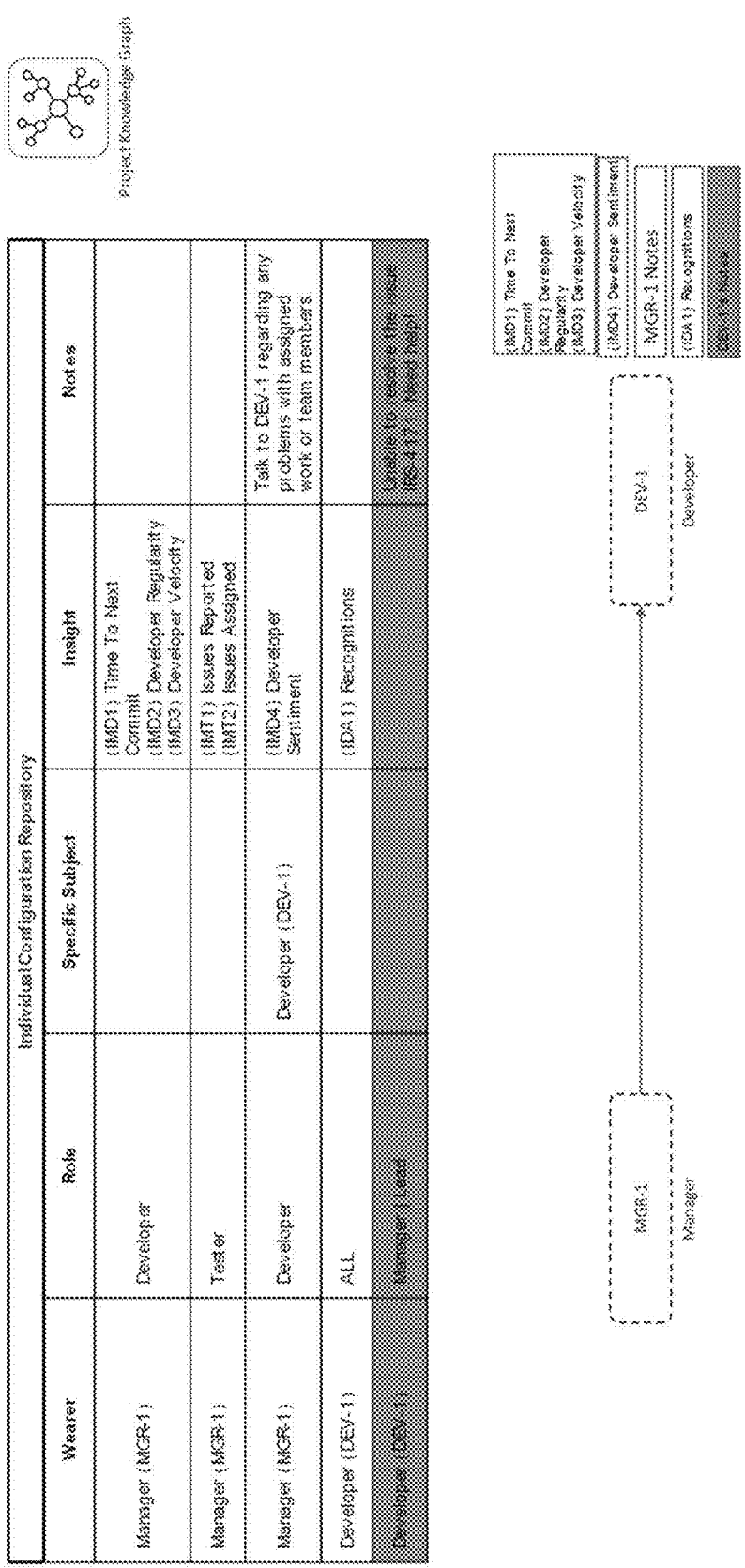

For example, FIG. 18 illustrates individual configuration management for the insights prioritization analyzer of the apparatus 100 in accordance with an example of the present disclosure.

Referring to FIG. 18, a user (e.g., wearer) and the subject(s) may add personalized configurations on what insight the user should see while looking at the subject using a head mounted display (HMD), For example, both the subject person 122 and user 108 may configure insights that are to be shown. For example, the subject (e.g., a developer) may want to show the user a recent recognition whenever the user passes by the subject's desk. Similarly, a user may configure a list of insights that the user may want to visualize when in the close proximity of the subject (e.g., the subject's code commits statistics for the entire week). In FIG. 18, at Row 1, a manager (e.g., the user 108) may configure that he/she wants to visualize 3 insights (IMD1, IMD2, IMD3) whenever he/she is close to a developer. At Row 3, similarly, the manager may configure specific insight (IMD4) as an additional insight, and a note that he/she wants to see when he/she is close to or looking at a specific developer DEV-1.

FIGS. 19-27 illustrate configuration based insights prioritization for the insights prioritization analyzer of the apparatus 100 in accordance with an example of the present disclosure.

For example, FIGS. 19-27 illustrate prioritizing the insights based on initial configurations implemented by the user 108 (e.g., wearer) and the subject person 122. In this regard, FIG. 19 illustrates generation of the project knowledge graph 900 based on the individual configuration repository 1000. For FIGS. 20 and 21, in a similar manner as disclosed herein with respect to FIG. 18, insights that are to be shown to the manager (e.g., MGR-1) are shown in the insight column at 2000, when the manager is looking at DEV-1. In FIGS. 22-27, as each row in the individual configuration repository 1000 is evaluated, and corresponding insights that satisfy the criteria may be appended to the insights list at 2200 (e.g., blocks next to DEV-1). These are the final insights that may be shown to MGR-1 for DEV-1.

Figure 28:
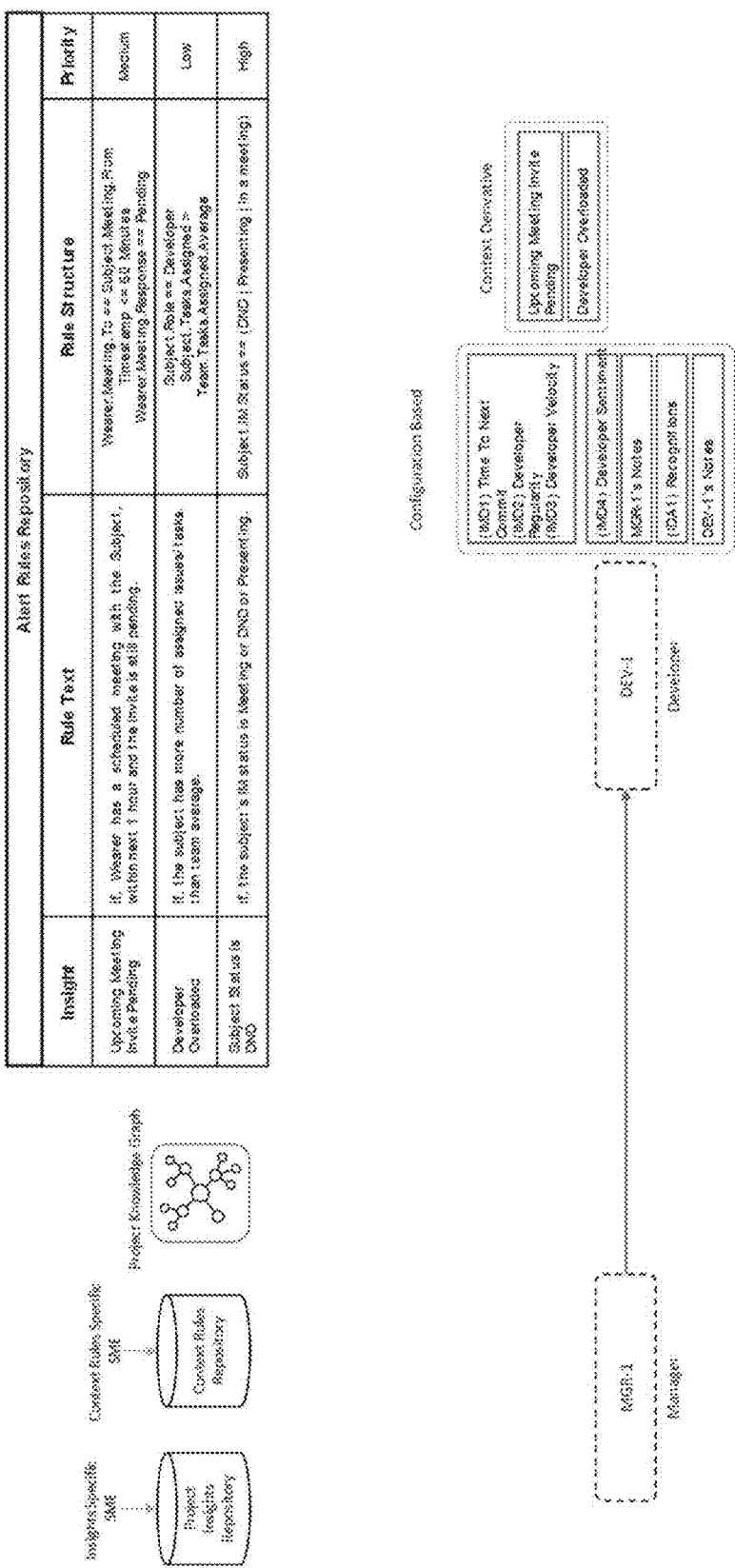
FIG. 28 illustrates alert rules based insights prioritization for the insights prioritization analyzer of the extended reality based immersive project workspace creation apparatus of FIG. 1 in accordance with an example of the present disclosure.

FIG. 28 illustrates alert rules based insights prioritization for the insights prioritization analyzer of the apparatus 100 in accordance with an example of the present disclosure.

For example, FIG. 28 illustrates prioritizing insights based upon certain insight specific rules maintained, for example, by a project subject matter expert. Similar to FIGS. 22-27, where configurations were evaluated to generate the insights set, for FIG. 28, specific criteria specified in the alerts rule repository 1004 may be evaluated to append entries to the insights list. For example, Row 3 specifies, that an insight "Developer Status is DND" should be shown to the user 108 if the corresponding rule structure is correct. This rule may be evaluated using the project knowledge graph 900. The insight, if shown, may inform the manager to not disturb the developer, since he/she has set his/her status to "Do Not Disturb."

Figure 29:
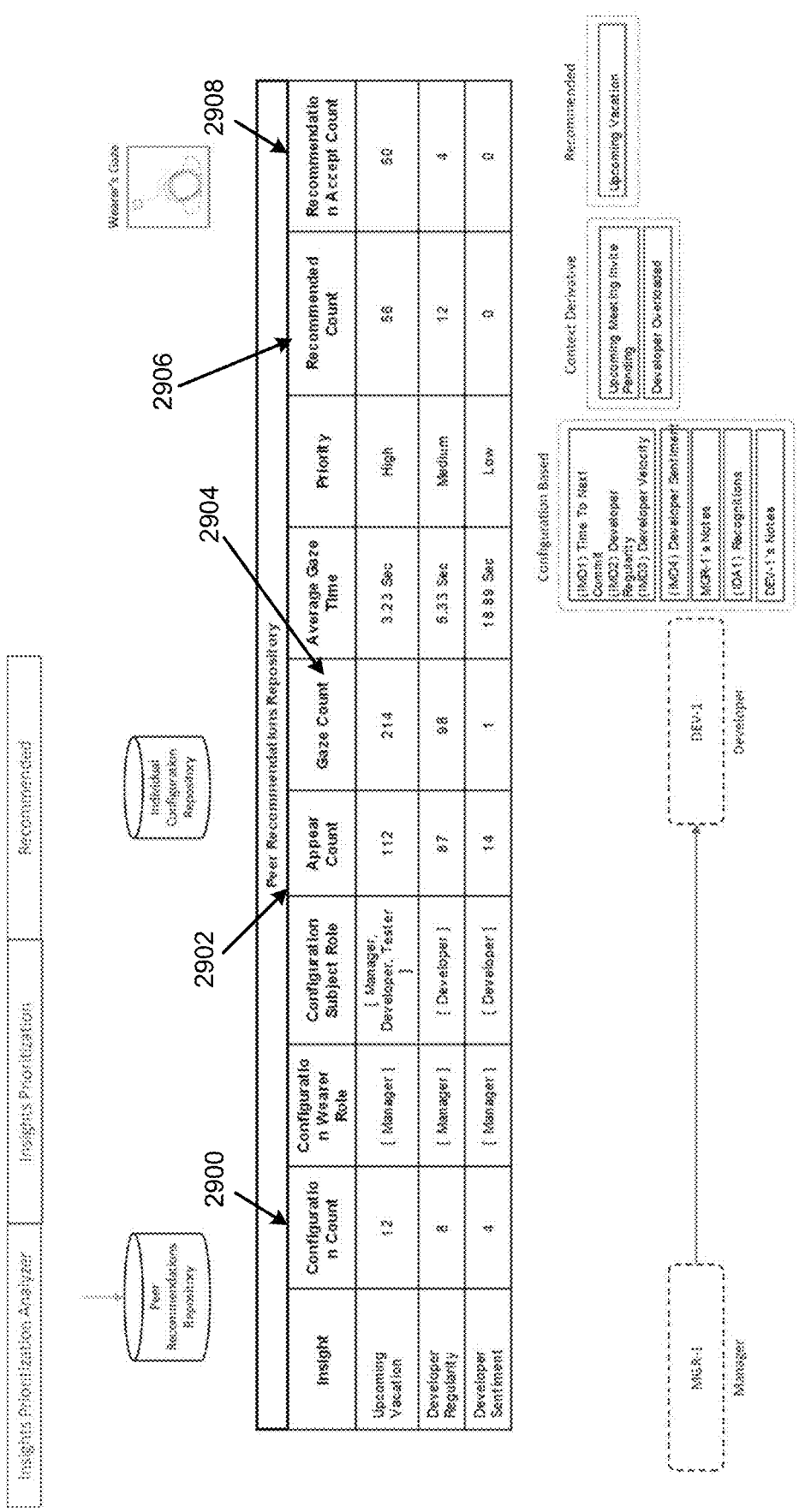
FIG. 29 illustrates recommended insights prioritization for the insights prioritization analyzer of the extended reality based immersive project workspace creation apparatus of FIG. 1 in accordance with an example of the present disclosure.

FIG. 29 illustrates recommended insights prioritization for the insights prioritization analyzer of the apparatus 100 in accordance with an example of the present disclosure.

For example, FIG. 29 illustrates prioritizing insights based upon criteria that include recommendations by peers (e.g., depending upon their configurations), and previous usage information. The previous usage information may include, for example, how many times an insight was delivered to a user and out of those how many times the user actually gazed and spent time on the insight. As specified in FIG. 10, insights may be prioritized in three ways, configurations, alerts and finally recommendation. Configurations and alerts have been discussed above. With respect to recommendations, depending upon what insights the users peers have configured or looked at, few additional insights may automatically be added to the insights list and shown to the user. The configuration count at 2900 may describe how many peers have configured this insight in their configurations. The appear count at 2902 may represent how many times total this insight has been shown. The gaze count at 2904 may represent how many times this insight was looked at by the user 108. The recommended count at 2906 may represent how many times this insight was recommended to other peers. The recommended accepted count at 2908 may represent how many times, when this insight was automatically recommended, it was marked as useful by the user 108.

Figure 30:
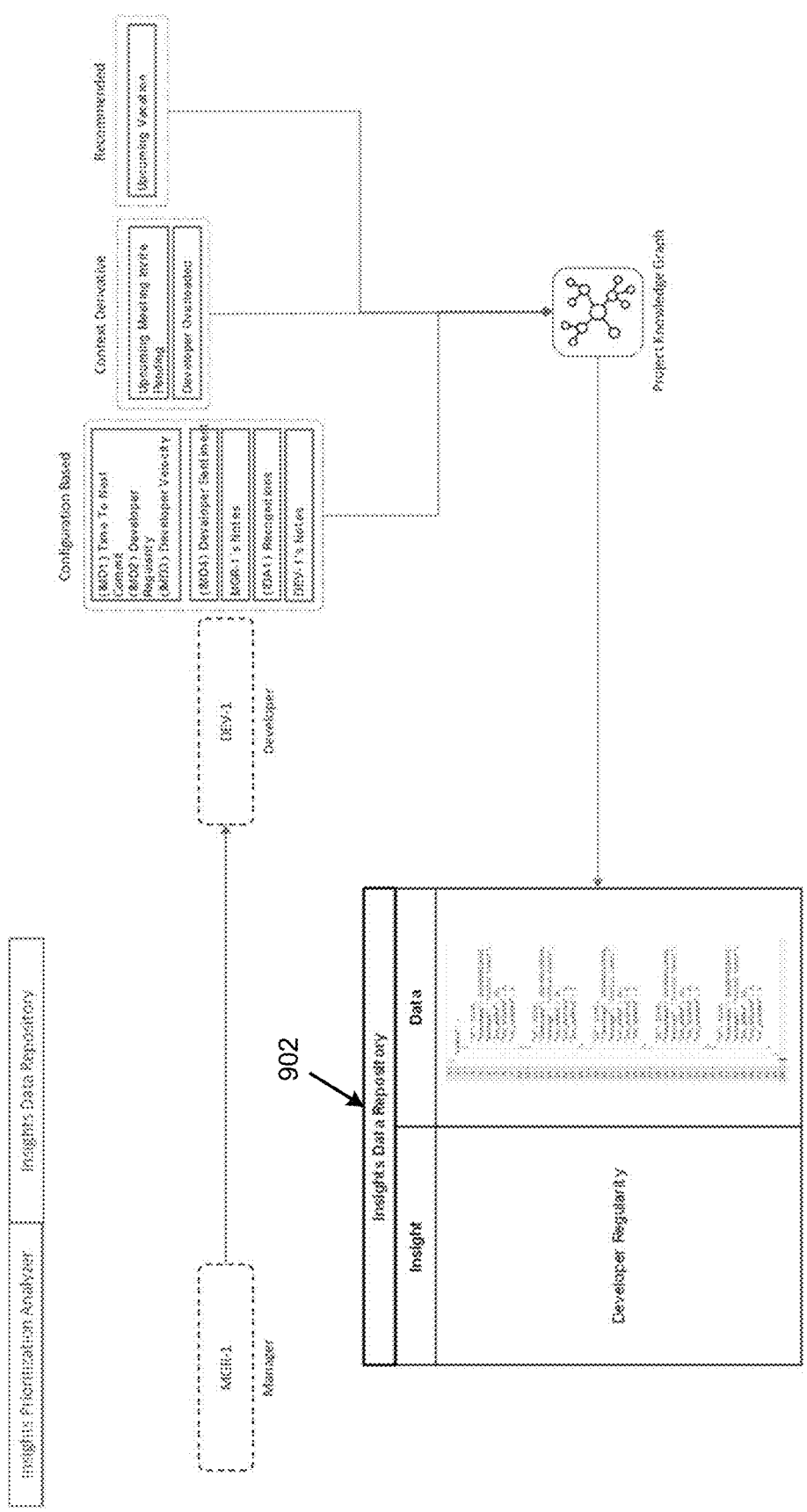
FIG. 30 illustrates an insights data repository for the insights prioritization analyzer of the extended reality based immersive project workspace creation apparatus of FIG. 1 in accordance with an example of the present disclosure.

FIG. 30 illustrates an insights data repository for the insights prioritization analyzer of the apparatus 100 in accordance with an example of the present disclosure. FIG. 30 shows the final set of insights that have been prioritized to be shown to MGR-1 for DEV-1, with the insights being bucketed as per configurations, alert rules and recommendations. These insights may be converted to real-time data for rendering. The insights data repository 902 shows a specific insight from the list and data for that insight.

Figure 31:
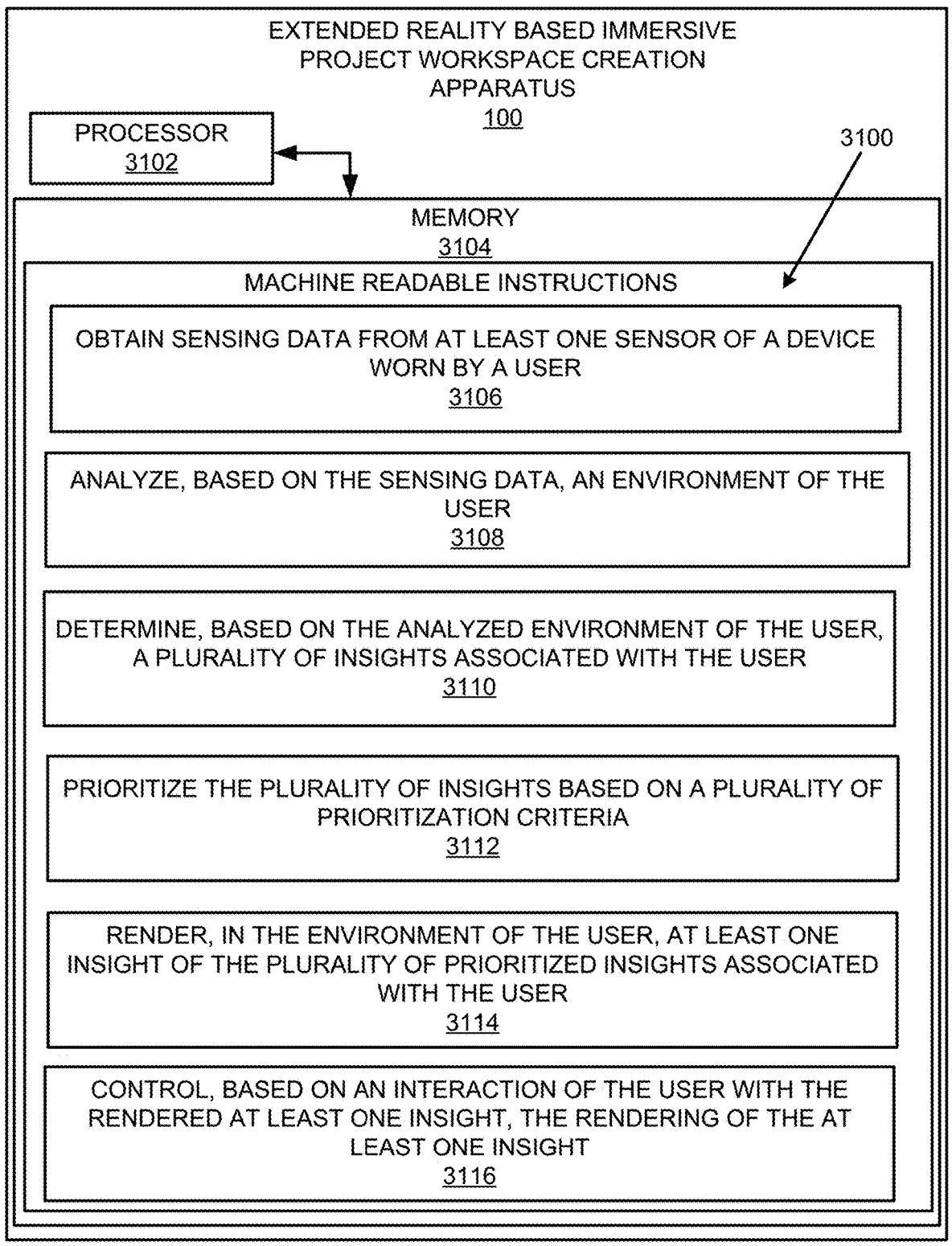
FIG. 31 illustrates an example block diagram for extended reality based immersive project workspace creation in accordance with an example of the present disclosure.
Figure 33:
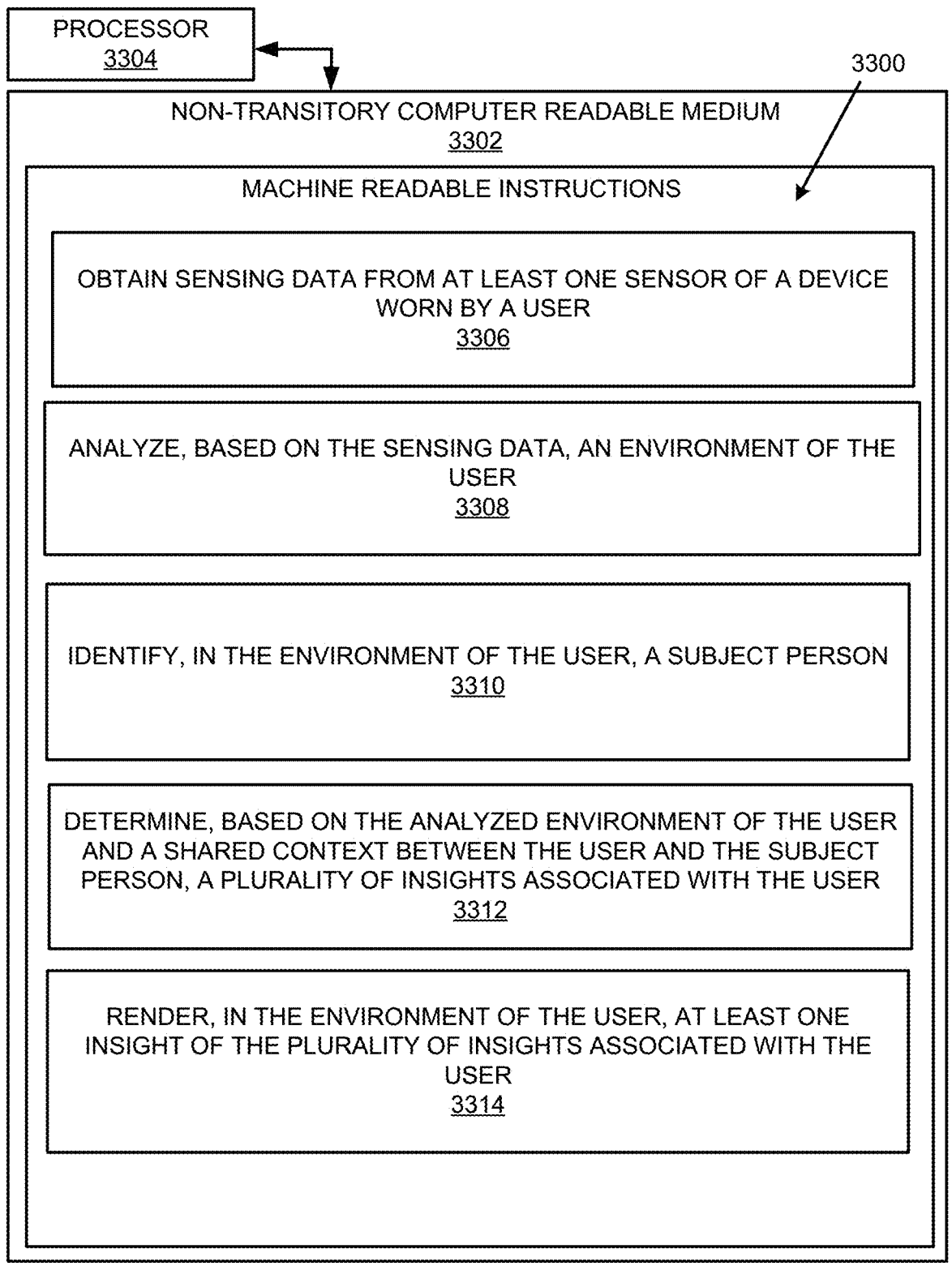
FIG. 33 illustrates a further example block diagram for extended reality based immersive project workspace creation in accordance with another example of the present disclosure.

FIGS. 31-33 respectively illustrate an example block diagram 3100, a flowchart of an example method 3200, and a further example block diagram 3300 for extended reality based immersive project workspace creation, according to examples. The block diagram 3100, the method 3200, and the block diagram 3300 may be implemented on the apparatus 100 described above with reference to FIG. 1 by way of example and not of limitation. The block diagram 3100, the method 3200, and the block diagram 3300 may be practiced in other apparatus. In addition to showing the block diagram 3100, FIG. 31 shows hardware of the apparatus 100 that may execute the instructions of the block diagram 3100. The hardware may include a processor 3102, and a memory 3104 storing machine readable instructions that when executed by the processor cause the processor to perform the instructions of the block diagram 3100. The memory 3104 may represent a non-transitory computer readable medium. FIG. 32 may represent an example method for extended reality based immersive project workspace creation, and the steps of the method. FIG. 33 may represent a non-transitory computer readable medium 3302 having stored thereon machine readable instructions to provide extended reality based immersive project workspace creation according to an example. The machine readable instructions, when executed, cause a processor 3304 to perform the instructions of the block diagram 3300 also shown in FIG. 33.

The processor 3102 of FIG. 31 and/or the processor 3304 of FIG. 33 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 3302 of FIG. 33), such as hardware storage devices (e.g., RAM (random access memory), ROM (read only memory), EPROM (erasable, programmable ROM), EEPROM (electrically erasable, programmable ROM), hard drives, and flash memory). The memory 3104 may include a RAM, where the machine readable instructions and data for a processor may reside during runtime.

Referring to FIGS. 1-31, and particularly to the block diagram 3100 shown in FIG. 31, the memory 3104 may include instructions 3106 to obtain sensing data 104 from at least one sensor of a device 106 worn by a user 108.

The processor 3102 may fetch, decode, and execute the instructions 3108 to analyze, based on the sensing data 104, an environment 110 of the user 108.

The processor 3102 may fetch, decode, and execute the instructions 3110 to determine, based on the analyzed environment 110 of the user 108, a plurality of insights 114 associated with the user 108.

The processor 3102 may fetch, decode, and execute the instructions 3112 to prioritize the plurality of insights 114 based on a plurality of prioritization criteria 116.

The processor 3102 may fetch, decode, and execute the instructions 3114 to render, in the environment 110 of the user 108, at least one insight of the plurality of prioritized insights 114 associated with the user 108.

The processor 3102 may fetch, decode, and execute the instructions 3116 to control, based on an interaction of the user 108 with the rendered at least one insight, the rendering of the at least one insight.

Referring to FIGS. 1-30 and 32, and particularly FIG. 32, for the method 3200, at block 3202, the method may include obtaining sensing data 104 from at least one sensor of a device 106 worn or utilized by a user 108

At block 3204, the method may include analyzing, based on the sensing data 104, an environment 110 of the user 108.

At block 3206, the method may include determining, based on the analyzed environment 110 of the user 108, a plurality of insights 114 associated with a project 118 being performed by the user 108.

At block 3208, the method may include rendering, in the environment 110 of the user 108, at least one insight of the plurality of insights 114 associated with the project being performed by the user 108.

Referring to FIGS. 1-30 and 33, and particularly FIG. 33, for the block diagram 3300, the non-transitory computer readable medium 3302 may include instructions 3306 to obtain sensing data 104 from at least one sensor of a device 106 worn or utilized by a user 108.

The processor 3304 may fetch, decode, and execute the instructions 3308 to analyze, based on the sensing data 104, an environment 110 of the user 108.

The processor 3304 may fetch, decode, and execute the instructions 3310 to identify, in the environment 110 of the user 108, a subject person 122.

The processor 3304 may fetch, decode, and execute the instructions 3312 to determine, based on the analyzed environment 110 of the user 108 and a shared context between the user 108 and the subject person 122, a plurality of insights 114 associated with the user 108.

The processor 3304 may fetch, decode, and execute the instructions 3314 to render, in the environment 110 of the user 108, at least one insight of the plurality of insights 114 associated with the user 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An extended reality based immersive project workspace creation apparatus comprising:
  a workplace understanding analyzer, executed by at least one hardware processor, to:
    obtain sensing data from at least one depth sensor of a mixed reality head mounted display device worn or utilized by a user to perform environment spatial mapping of an environment of the user;
    perform the environment spatial mapping using the sensing data by utilizing a deep learning model to identify features in the environment of the user; and
    analyze, based on the performance of the environment spatial mapping, the environment of the user to identify objects, a particular person, and at least one area in the environment of the user that is unobstructed by the objects and the particular person, wherein the particular person is a team member of a project and assigned a project task;
an insights prioritization analyzer, executed by the at least one hardware processor, to:
  determine, based on the objects and the particular person identified in the environment of the user, a plurality of insights including an insight showing the project task being performed by the particular person; and
  prioritize the plurality of insights based on a plurality of prioritization criteria; and
an insights rendering and interaction controller, executed by the at least one hardware processor, to:
  based on the prioritization of the plurality of insights, render, in a three-dimensional (3D) graphical user interface of the mixed reality head mounted display device, the insight showing the project task being performed by the particular person, wherein the insight is rendered in an area of the 3D graphical user interface that overlays the at least one area in the environment of the user that is unobstructed by the objects and the particular person; and
  control, based on a gesture-based interaction of the user with the rendered insight, the rendering of the insight by overlaying the insight relative to the user, wherein the gesture-based interaction includes at least one of hand manipulation, eye movement, or speech to manipulate the rendering of the insight.

2. The extended reality based immersive project workspace creation apparatus according to claim 1, wherein the insights prioritization analyzer is executed by the at least one hardware processor to:
  prioritize the plurality of insights based on the plurality of prioritization criteria, wherein one of the plurality of prioritization criteria accounts for a physical distance between the user and the particular person.

3. The extended reality based immersive project workspace creation apparatus according to claim 1, wherein the insights rendering and interaction controller is further executed by the at least one hardware processor to render, in the 3D graphical user interface of the mixed reality head mounted display device, a light bulb above the particular person signifying whether the particular person needs guidance with the project task.

4. The extended reality based immersive project workspace creation apparatus according to claim 1, wherein:
  the workplace understanding analyzer is executed by the at least one hardware processor to map the environment of the user into a 3D canvas; and
  the insights rendering and interaction controller is executed by the at least one hardware processor to render, on the 3D canvas, the insight showing the project task being performed by the particular person.

5. The extended reality based immersive project workspace creation apparatus according to claim 1, wherein the insights prioritization analyzer is executed by the at least one hardware processor to modify, based on a modification to a shared context between the user and the particular person, the plurality of insights.

6. The extended reality based immersive project workspace creation apparatus according to claim 1, wherein the insights rendering and interaction controller is executed by the at least one hardware processor to:
  ascertain, for the particular person, a list of insights that is configured by the particular person from the plurality of insights; and
  render, in the 3D graphical user interface of the mixed reality head mounted display device, at least one insight from the list of insights that is configured by the particular person.

7. The extended reality based immersive project workspace creation apparatus according to claim 1, wherein the insights rendering and interaction controller is executed by the at least one hardware processor to:
  ascertain, for the particular person, a do not disturb status that is associated with an insight associated with the particular person; and
  render, in the 3D graphical user interface of the mixed reality head mounted display device, another insight associated with the particular person that does not include the insight including the do not disturb status associated with the particular person.

8. The extended reality based immersive project workspace creation apparatus according to claim 1, wherein the insights rendering and interaction controller is executed by the at least one hardware processor to:
  ascertain, for the user, a list of insights that is configured by the user from the plurality of insights; and
  render, in the 3D graphical user interface of the mixed reality head mounted display device, at least one insight from the list of insights that is configured by the user.

9. The extended reality based immersive project workspace creation apparatus according to claim 1, wherein the insights prioritization analyzer is executed by the at least one hardware processor to determine, based on a role of the user as a project head and a role of the particular person as a team member of the project, the plurality of insights.

10. The extended reality based immersive project workspace creation apparatus according to claim 1, wherein the insights rendering and interaction controller is executed by the at least one hardware processor to:
  determine, based on the environment of the user, whether the insight showing the project task being performed by the particular person is blocked by another insight of the plurality of insights; and
  based on a determination that the insight showing the project task being performed by the particular person is blocked by the other insight of the plurality of insights, modify a rendered location of the insight showing the project task being performed by the particular person to not be blocked by the other insight of the plurality of insights.

11. The extended reality based immersive project workspace creation apparatus according to claim 1, wherein:
  the plurality of insights include ticket data insights that represent tasks that are to be performed by the user; and
  the insights rendering and interaction controller is executed by the at least one hardware processor to render, in the 3D graphical user interface of the mixed reality head mounted display device, at least one ticket data insight of the ticket data insights.

12. The extended reality based immersive project workspace creation apparatus according to claim 11, wherein the insights rendering and interaction controller is executed by the at least one hardware processor to render, in the 3D graphical user interface of the mixed reality head mounted display device, the at least one ticket data insight of the ticket data insights to include at least one of a shape, a size, or a color that represents a priority associated with the at least one ticket data insight.

13. The extended reality based immersive project workspace creation apparatus according to claim 1, wherein the insights prioritization analyzer is executed by the at least one hardware processor to prioritize the plurality of insights based on the plurality of prioritization criteria that include of a number of times or a length of time that the user spends analyzing an insight within a specified time duration.

14. A method for extended reality based immersive project workspace creation, the method comprising:
obtaining, by at least one hardware processor, sensing data from at least one depth sensor of a mixed reality head mounted display device worn or utilized by a user to perform environment spatial mapping of an environment of the user;
performing, by the at least one hardware processor, the environment spatial mapping using the sensing data by utilizing a deep learning model to identify features in the environment of the user;
analyzing, by the at least one hardware processor and based on the performance of the environment spatial mapping, the environment of the user to identify objects, a particular person, and an area in the environment of the user that is unobstructed by the objects and the particular person, wherein the particular person is a team member of a project and assigned a project task;
determining, by the at least one hardware processor, based on the objects and the particular person identified in the environment of the user, a plurality of insights including an insight showing the project task being performed by the particular person;
rendering, by the at least one hardware processor, in a three-dimensional (3D) graphical user interface of the mixed reality head mounted display device, the insight showing the project task being performed by the particular person, wherein the insight is rendered in an area of the 3D graphical user interface that overlays the area in the environment of the user that is unobstructed by the objects and the particular person; and
controlling, by the at least one hardware processor and based on a gesture-based interaction of the user with the rendered insight, the rendering of the insight by overlaying the insight relative to the user, wherein the gesture-based interaction includes at least one of hand manipulation, eye movement, or speech to manipulate the rendering of the insight.

15. The method for extended reality based immersive project workspace creation according to claim 14, further comprising:
prioritizing, by the at least one hardware processor, the plurality of insights based on a plurality of prioritization criteria, wherein at least one prioritization criterion of the plurality of prioritization criteria accounts for the project task being performed by the particular person; and
based on the prioritization of the plurality of insights, rendering, by the at least one hardware processor, in the 3D graphical user interface of the mixed reality head mounted display device, the insight showing the project task being performed by the particular person.

16. A non-transitory computer readable medium having stored thereon machine readable instructions, the machine readable instructions, when executed by at least one hardware processor, cause the at least one hardware processor to:
obtain sensing data from at least one depth sensor of a mixed reality head mounted display device worn or utilized by a user to perform environment spatial mapping of an environment of the user;
perform the environment spatial mapping using the sensing data by utilizing a deep learning model to identify features in the environment of the user;
analyze, based on the performance of the environment spatial mapping, the environment of the user to identify objects, a particular person, and an area in the environment of the user that is unobstructed by the objects and the particular person, wherein the particular person is a team member of a project and assigned a project task;
determine, based on the objects and the particular person identified in the environment of the user, a plurality of insights including an insight showing the project task being performed by the particular person;
render, in a three-dimensional (3D) graphical user interface of the mixed reality head mounted display device, the insight showing the project task being performed by the particular person, wherein the insight is rendered in an area of the 3D graphical user interface that overlays the area in the environment of the user that is unobstructed by the objects and the particular person; and
control, based on a gesture-based interaction of the user with the rendered insight, the rendering of the insight by overlaying the insight relative to the user, wherein the gesture-based interaction includes at least one of hand manipulation, eye movement, or speech to manipulate the rendering of the insight.

17. The non-transitory computer readable medium according to claim 16, wherein the machine readable instructions, when executed by the at least one hardware processor, further cause the at least one hardware processor to:
ascertain, for the particular person, a list of insights that is configured by the particular person from the plurality of insights; and
render, in the 3D graphical user interface of the mixed reality head mounted display device, at least one insight from the list of insights that is configured by the particular person.

18. The non-transitory computer readable medium according to claim 16, wherein the machine readable instructions, when executed by the at least one hardware processor, further cause the at least one hardware processor to:
render, in the 3D graphical user interface of the mixed reality head mounted display device, a light bulb signifying whether the particular person needs guidance with the project task.

* * * * *